(12) United States Patent
Schuster et al.

(10) Patent No.: US 6,182,233 B1
(45) Date of Patent: Jan. 30, 2001

(54) INTERLOCKED PIPELINED CMOS

(75) Inventors: Stanley Everett Schuster, Granite Springs; Peter William Cook, Mount Kisco, both of NY (US)

(73) Assignee: International Business Machines Corporation, Armonk, NY (US)

( * ) Notice: Under 35 U.S.C. 154(b), the term of this patent shall be extended for 0 days.

(21) Appl. No.: 09/196,985

(22) Filed: Nov. 20, 1998

(51) Int. Cl.[7] ....................................................... G06F 1/12
(52) U.S. Cl. ................................................................ 713/400
(58) Field of Search ................................... 713/500, 600, 713/400; 712/1, 41; 710/58, 61; 326/93, 101; 327/141, 142, 154, 155

(56) References Cited

U.S. PATENT DOCUMENTS

| | | | |
|---|---|---|---|
| 4,855,958 | * | 8/1989 | Ikeda ................................ 365/230.08 |
| 5,027,355 | * | 6/1991 | Stoica .................................... 714/724 |
| 5,300,831 | * | 4/1994 | Pham et al. ............................. 326/44 |
| 5,305,463 | | 4/1994 | Fant et al. . |
| 5,416,362 | * | 5/1995 | Byers et al. ........................... 327/202 |
| 6,034,912 | * | 3/2000 | Isomura et al. .................. 365/230.03 |

OTHER PUBLICATIONS

T. Williams, et al., "A Zero–Overhead Self–Timed 160–ns 54–b CMOS Divider", IEEE Journal of Solid–State Circuits, vol. 26, No. 11, Nov. 1991.
T. Chappell et al., A 2–ns Cycle 3.8–ns Access 512–kb CMOS ECL SRAM with a Fully Pipelined Architecture, IEEE Journal of Solid–State Circuits, vol. 26, No. 11, Nov. 1991.
I. Sutherland, "Micropipelines", Communications of the ACM, vol. 32, No. 6, Jun. 1989.
S. Schuster, et al., "On–Chip Test Circuitry for a 2–ns Cycle, 512–kb CMOS ECL Sram", IEEE Journal of Solid–State Circuits, vol. 27, No. 7, Jul. 1992.
T. Werner, "Asynchronous Processor Survey", IEEE Nov. 1997.
C. Seitz, "Sysetm Timing", Introduction to VLSI Systems, Carver Mead—Lynn Conway, pp. 218–262.

* cited by examiner

Primary Examiner—Thomas M. Heckler
(74) Attorney, Agent, or Firm—McGuireWoods LLP; Kevin M. Jordan

(57) ABSTRACT

An interlocked pipelined CMOS (IPCMOS) family of logic circuits provides extremely high performance pipelined operation and guarantees error free operation where variations in timing are compensated for automatically by the circuits. The IPCMOS logic circuits also provide a standard interface that makes it possible to interface different macro types easily. The IPCMOS logic circuits feature interlocking in both the forward and reverse directions. This "handshaking" guarantees error free timing and makes it possible to eliminate the need for a global clock at the macro level. Timing signals are generated locally at the macro level from the handshaking signals between macros. This makes it possible for the local circuits to deal with global timing variations caused by power supply noise, ACLV, and parameter variations. The macros operate in a pipelined mode with data advancing automatically from macro to macro with the timing controlled by the local handshaking signals. This pipelined operation results in an extremely fast cycle time. Another feature of IPCMOS is that the data inputs to a macro are only sampled when the data is in a valid state. making the concept of a standard macro interface possible. With this standard interface, different logic types such as static and dynamic circuits can be easily interconnected and the concept of reusable macros becomes a reality.

20 Claims, 46 Drawing Sheets

CYCLE TIME = (5+X) x 1.2

CYCLE TIME = (X) x 1.2 + 0.3

VCO CYCLE TIME VERSUS CONTROL VOLTAGE.

INTERLOCKED PIPELINED CMOS

BACKGROUND OF THE INVENTION

1. Field of the Invention

The present invention generally relates to Complementary Metal Oxide Semiconductor (CMOS) Integrated Circuits (ICs) and, more particularly, to an Interlocked Pipelined CMOS (IPCMOS) family of logic circuits.

2. Background Description

Circuit techniques are key to implementing the interlocked pipelined approach. In order for the approach to be viable, the circuit techniques must be extremely fast, simple, reliable, and very efficient. The general concepts of handshaking or interlocking and pipelining and asynchronous self-timing are not new and have all been proposed in a variety of forms for systems.

The Muller C-element described by Carver Mead and Lynn Conway in Chapter 7 of *Introduction to VLSI Systems*, published by Addison-Wesley Publishing Company Inc. (1980), and shown in FIG. 18 is a bistable device whose output becomes a "1" only after all of its inputs are "1" and whose output becomes a "0" only after all of its inputs are "0". The major problem with this circuit, aside from speed issues for large fan-ins, is that all its inputs must overlap for both the "0" and "1" cases or there will be no change in the output state. For complex interconnections of circuit blocks, commonly called macros, that have different speeds and interconnections this may not be the case and the circuit will not perform the intended function.

Another self-timed element and a two-cycle signaling scheme described by Ivan E. Sutherland in "Micropipelines", *Communications of the ACM*, vol. 32, Number 6, pp. 720–738, June 1989, and in the book by Mead and Conway is given in FIG. 19. In this scheme, the elements pass data to each other using Request and Acknowledge lines to control the sequence in an asynchronous fashion as shown in the wave forms. Aside from not dealing with how to solve the problem of multiple macros being interconnected, this approach is slow since the Acknowledge signal as shown in the wave forms is initiated when the output of the macro reaches a stable state. This means that after data is received, the macro must do its function before sending an acknowledgment which inserts additional delay in the cycle time.

Control logic with completion information embedded within data signals is used in a self-timed divider described by T. E. Williams et al. in "A Zero-Overhead Self-Timed 160 ns 54-b CMOS Divider", *IEEE J. Solid State Circuits*, vol. 26, pp. 1651–1661, November 1991. In this design, local completion detectors and handshaking between fully asynchronous macros is used. The completion information is embedded in the data throughout the design by using a pair of wires for each bit. The individual completion signals from the bits in a data path are then combined using a C-element similar to the one described above. This approach needs dual wires for each data signal plus it faces the limitations of the C-element already mentioned above.

Fully pipelined architectures have been used to obtain very fast cycle times in SRAMs, as described by T. I. Chappel et al. in "A 2-ns Cycle, 3.8-ns Access 512-Kb CMOS ECL SRAM with a Fully Pipelined Architecture", *IEEE J Solid-State Circuits*, vol. 26, pp. 1577–1585, November 1991. This approach works well in a very regular environment such as one finds in memory, but is extremely difficult or impossible to implement in a more general environment without some kind of handshaking to guarantee reliable operation.

SUMMARY OF THE INVENTION

It is therefore an object of the present invention to provide a form of logic circuit that results in extremely high performance pipelined operation.

It is another object of the invention to provide logic circuits which guarantees error free operation where variations in timing are compensated for automatically by the circuits.

It is a further object of the invention to provide a standard interface that makes it possible to interface different macro types easily.

According to the invention, there is provided a circuit technique, here referred to as Interlocked Pipelined CMOS (IPCMOS), that results in extremely high performance and reliable operation. It uses interlocking in both the forward and reverse directions. This "handshaking" guarantees error free timing and makes it possible to eliminate the need for a global clock at the macro level. Timing signals are generated locally at the macro level from the handshaking signals between macros. This makes it possible for the local circuits to deal with global timing variations caused by power supply noise, ACLV (across chip linewidth variations), and parameter variations. The macros operate in a pipelined mode with data advancing automatically from macro to macro with the timing controlled by the local handshaking signals. This pipelined operation results in an extremely fast cycle time. Another feature of IPCMOS is that the data inputs to a macro are only sampled when the data is in a valid state, making the concept of a standard macro interface possible. With this standard interface, different logic types such as static and dynamic circuits can be easily interconnected and the concept of reusable macros becomes a reality.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
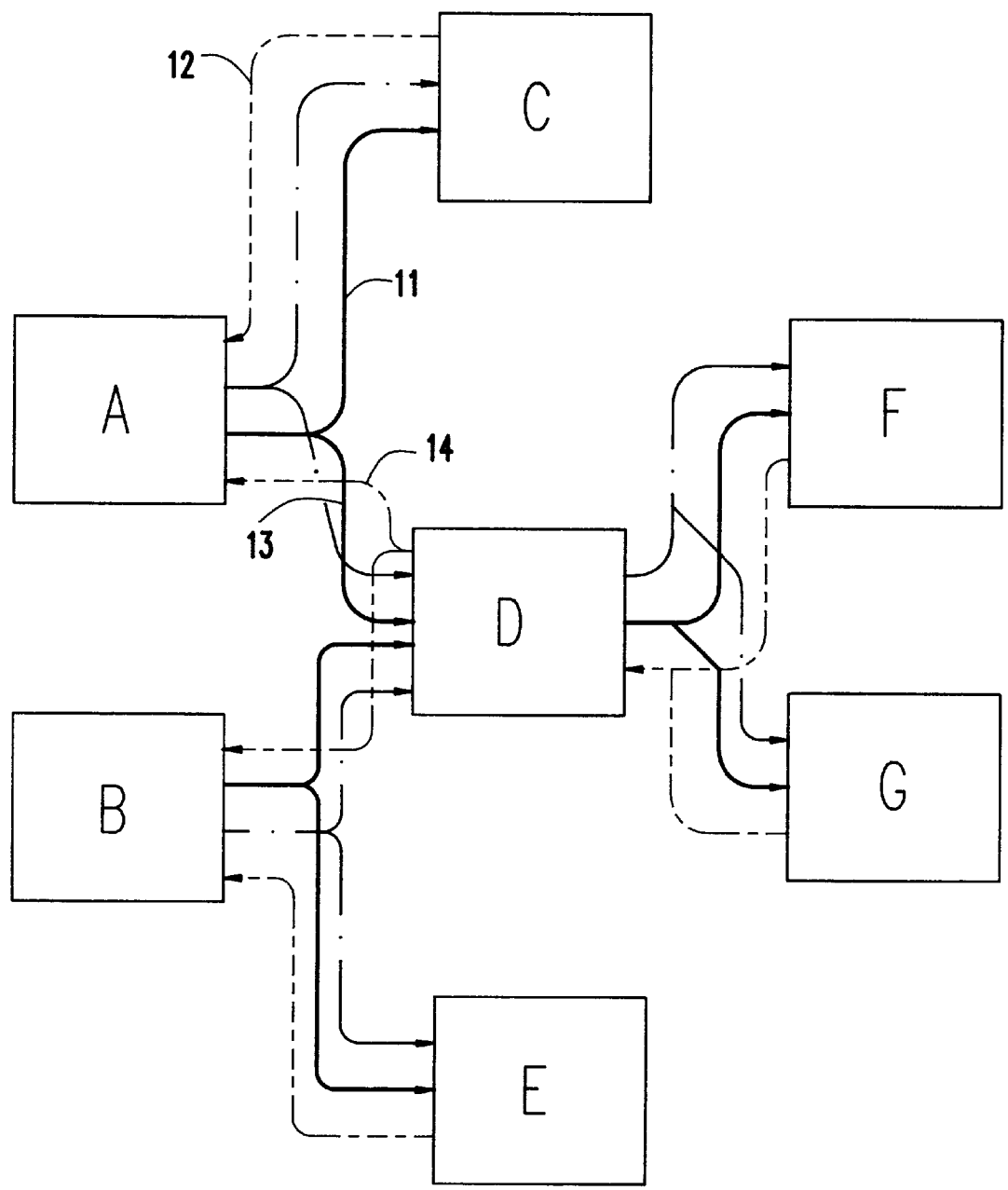
FIG. 1 is high level block diagram of the global macro level illustrating how the inteking or handshaking of the IPCMOS works.

Referring now to the drawings, and more particularly to FIG. 1, there is shown a block diagram which, at the global macro level, is helpful in understanding how the interlocking and handshaking of the IPCMOS circuits according to the invention works. As shown in FIG. 1, between each of the macros, labeled A through G, that are transmitting and receiving data there are two additional signal lines. Between macros A and C, for example, these are a forward direction signal line 11 and a reverse direction signal line 12. Similarly, between macros A and D, these are a forward direction signal line 13 (which may be common with signal line 11) and a reverse direction signal line 14. In the forward direction, the additional signal from the transmitting macro signifies that the data coming from this macro has reached a valid state; whereas in the reverse direction the additional reset signal from the receiving macro signifies that the data has been received. Thus, there is handshaking or interlocking in both the forward and reverse directions between each of the macros that are sending and receiving data.

Since each macro can be transmitting data to more than one macro and also receiving data from multiple macros, the forward valid signals must be "ANDed" together and the reverse reset signals must also be "ANDed" together to insure correct operation. This will become clearer by considering the block diagram of FIG. 1 in more detail. Consider macro D which is receiving data from macros A and B and transmitting data to macros F and G. For macro D to begin a new operation, two things must happen. Both the forward valid signals from macros A and B must transition indicating the input data is valid, and the reset from reverse interlocking signals from macros F and G must transition indicating these macros are ready to receive new data. By interlocking the timing this way a macro can begin an operation only when both the downstream and up stream macros it interfaces provide the required handshaking signals. It is interlocked in both directions for reliable operation.

Figure 2A:
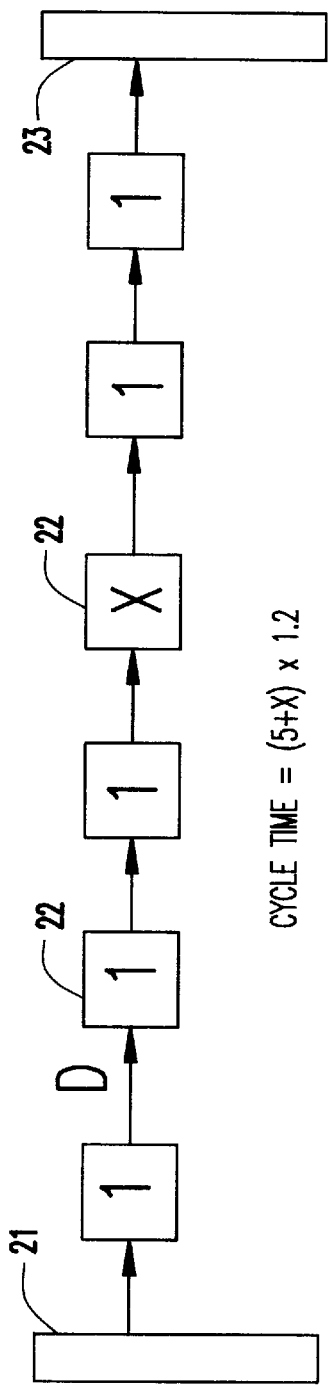
FIGS. 2A and 2B are block diagrams showing a comparison between respectively a conventional CMOS circuit and an IPCMOS circuit.
Figure 2B:
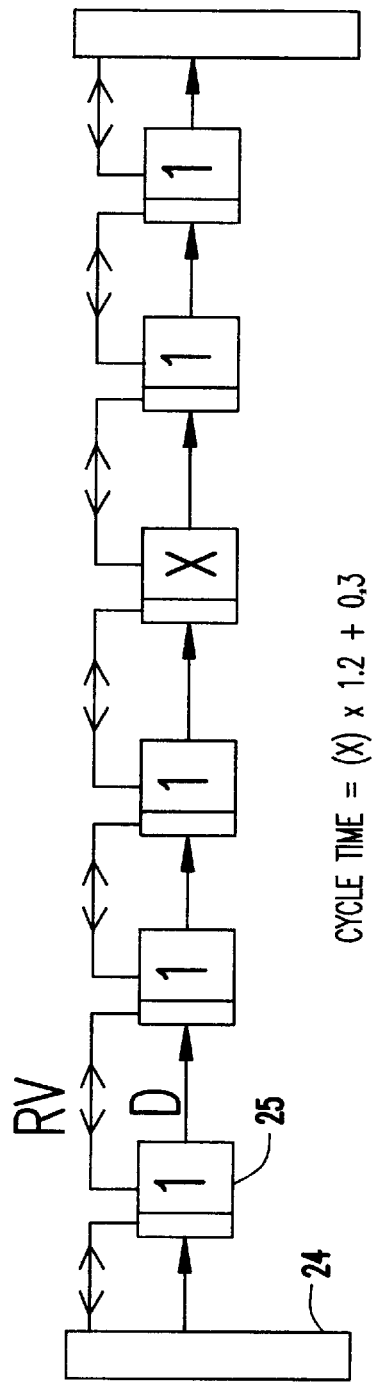

The difference between this interlocked approach and a more conventional approach is shown in FIGS. 2A and 2B. In logic using conventional CMOS circuits shown in FIG. 2A, data is launched from a register 21 by the global clock (not shown). The data then propagates through a number of stages 22 to another register 23 where it is captured by the next cycle of the global clock. The IPCMOS case is also shown in FIG. 2B interfacing a synchronous clocked register 24. However, data can be launched at a much faster rate since the macros are interlocked and pipelined. As soon as the first stage 25 in the pipe sends a reverse handshaking signal, data from the next cycle can be launched. When the pipe is full, data can be launched at a cycle time equal to the cycle time of the slowest pipe stage. As will be shown, this results in extremely fast cycle time. This mode of operation not only results in very high speed but very reliable operation as a result of the interlocked mode of operation where data only advances from one stage to the next when the appropriate handshaking has taken place.

One could pipeline the stages without handshaking, as described by T. I. Chappel et al. supra, but unless the environment is very regular and well controlled, there is the risk of timing errors. The interlocking also makes it possible to build a very simple asynchronous to synchronous interface that is very efficient. This will be discussed in more detail later. The asynchronous to synchronous interface would be exceedingly difficult or impossible to design without this interlocked handshaking. For the conventional CMOS approach shown in FIG. 2A, the cycle time as shown is the delay through each of the stages plus some factor to allow for clock skew and parameter variations. For the IPCMOS case shown in FIG. 2B, the cycle time is the cycle time of the slowest stage plus some factor for clock skew and parameter variations. This will be considerably faster than the cycle time of a conventional CMOS approach.

Simulation Results

Figure 3:
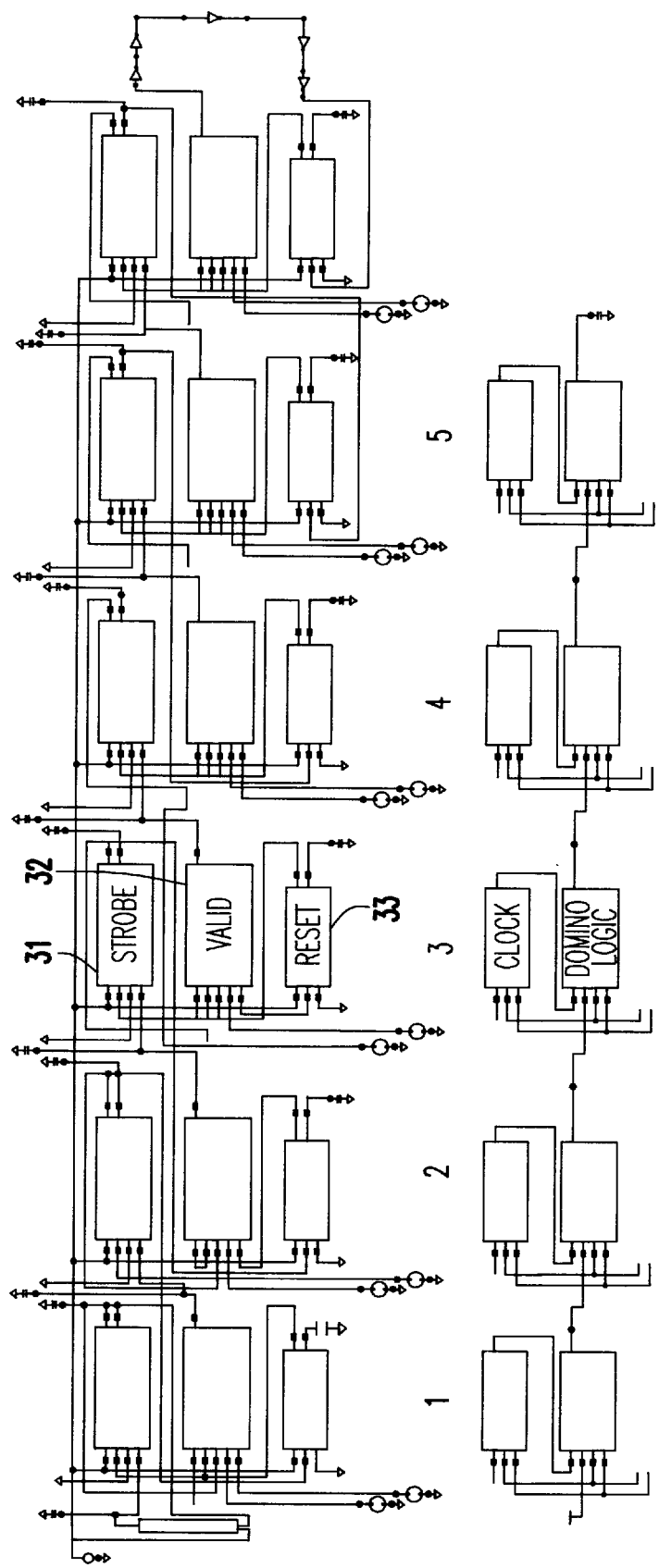
FIG. 3 is a block diagram of a simulation model that was used to simulate the performance of the IPCMOS approach according to the invention.

The high level view of the model that was used to simulate the performance of the IPCMOS approach is shown in FIG. 3. A five stage pipeline using dynamic domino logic was modeled. The circuitry at each stage needed for the interlocked pipelined handshaking consists of the Strobe, Valid, and Reset circuits. The Strobe function 31 is to detect that all its valid signals from upstream macros have transitioned, that a reset from the downstream macros has been received and to keep track of what cycle these signals are from. The Valid function 32 generates the valid signal that is attached to each group of data outputs. The Reset function 33 performs the "AND" function on the resets being sent from the downstream macros and keeps track of the cycle they occur in. Each dynamic domino stage also needs a clock. The circuits used in this clock and the circuits that do the handshaking will be described in detail in a later section.

Figure 4:
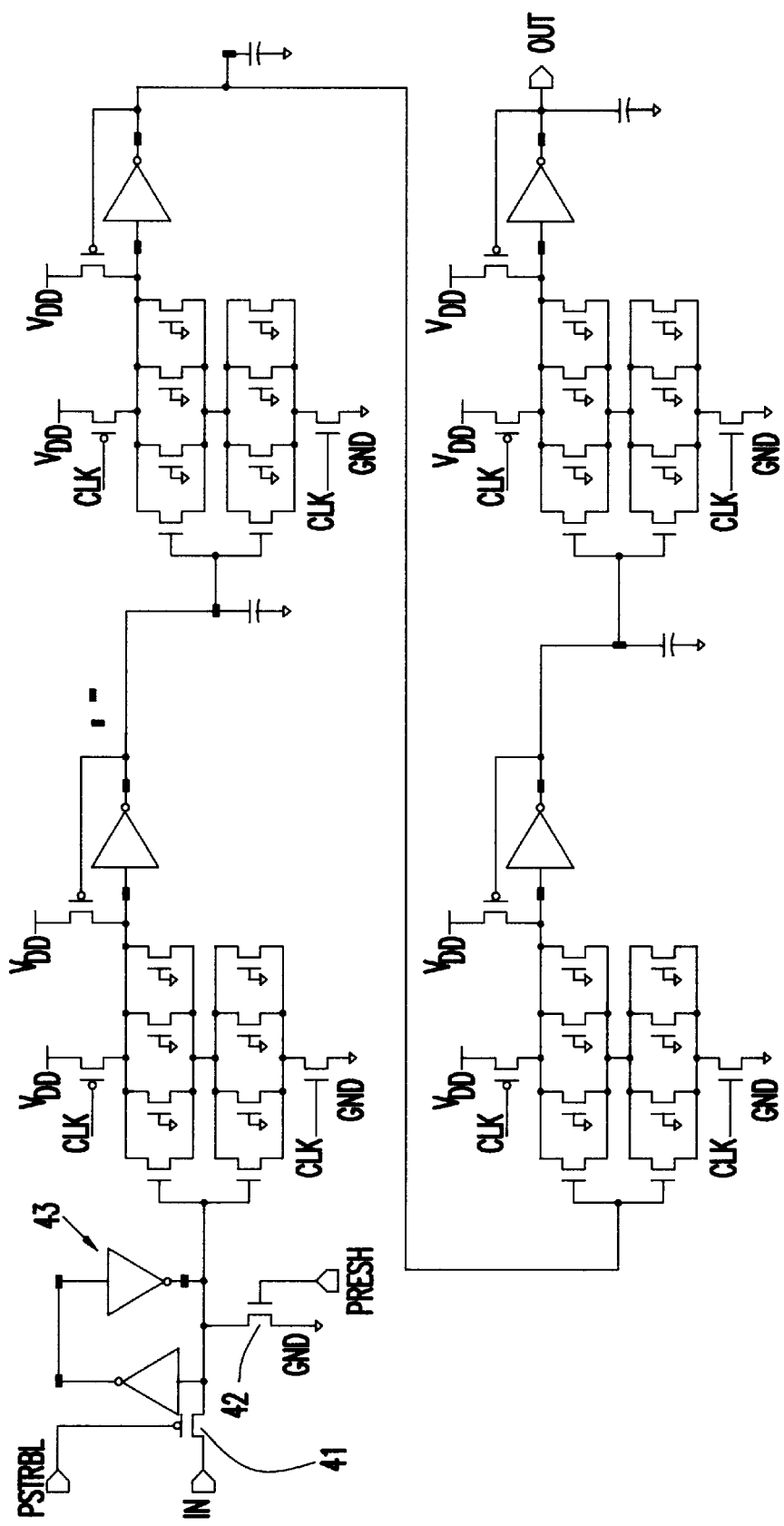
FIG. 4 is a block diagram of a pipeline stage consisting of a four stage domino block which was simulated to demonstrate the performance of the IPCMOS approach.

Several cases were considered. First, a pipeline stage consisting of the four stage domino macro (two high and four wide) shown in FIG. 4 was simulated. The added circuitry for the pipelined interlocked operation of this domino stage consists of a p-channel switch 41 in series with each data input that is driven by a strobe signal (PSTRBL) generated by the valid function, an n-channel device 42 on the internal node of the input data inputs driven by the reset signal from the Reset function, and a small latch 43 on this internal node to hold the state of the data on this dynamic node. This interface consisting of a switch in series with the data and a reset make it possible to capture and hold the data on each input and then to reset it when it is no longer needed. More will be said about this interface later. The delay through each stage of the four stage domino logic macro of FIG. 4 is about 180 picoseconds (ps).

Figure 5:
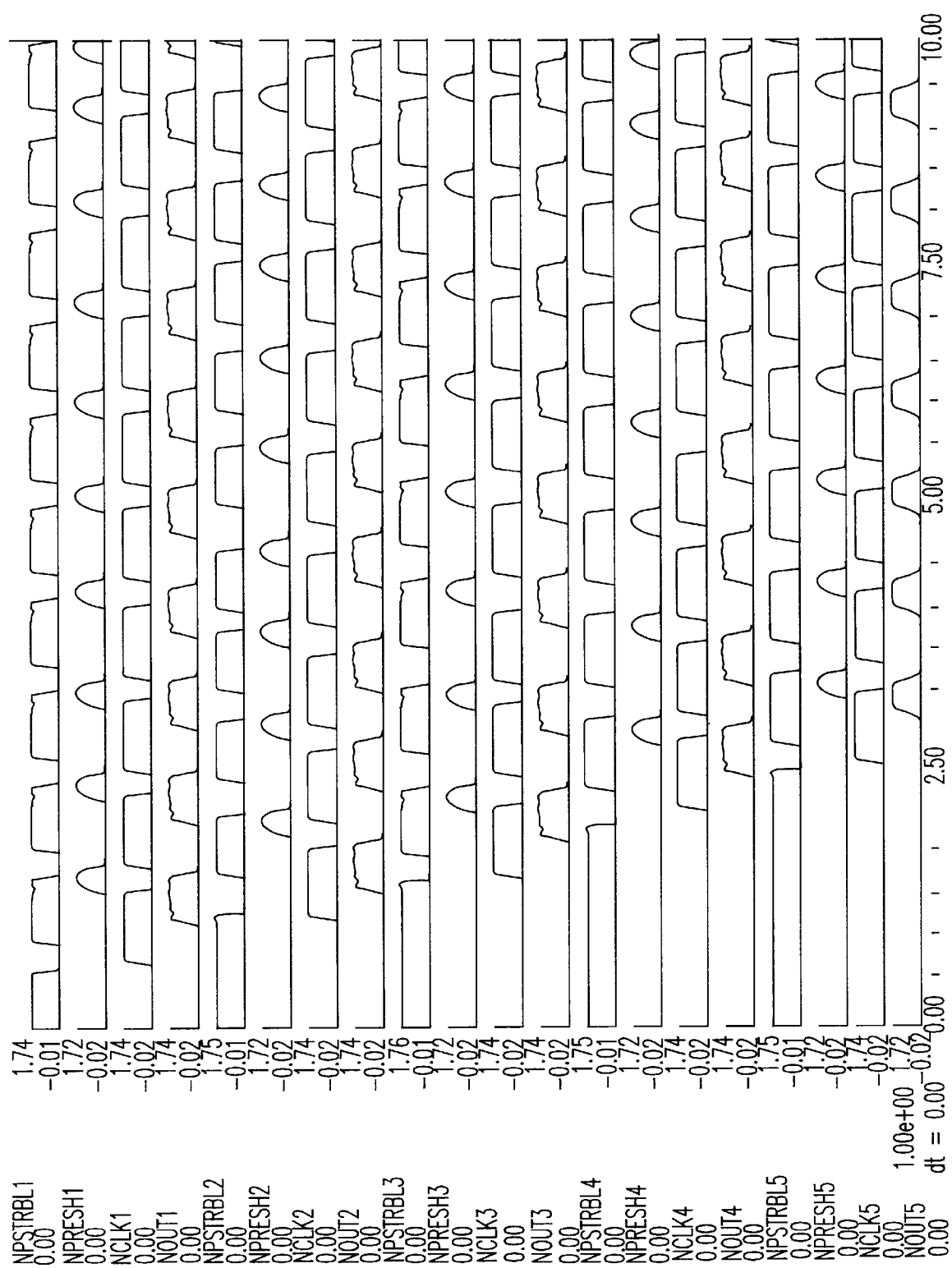
FIG. 5 is a graph showing simulated waveforms at each stage of the five stage pipeline of FIG. 3.
Figure 6:
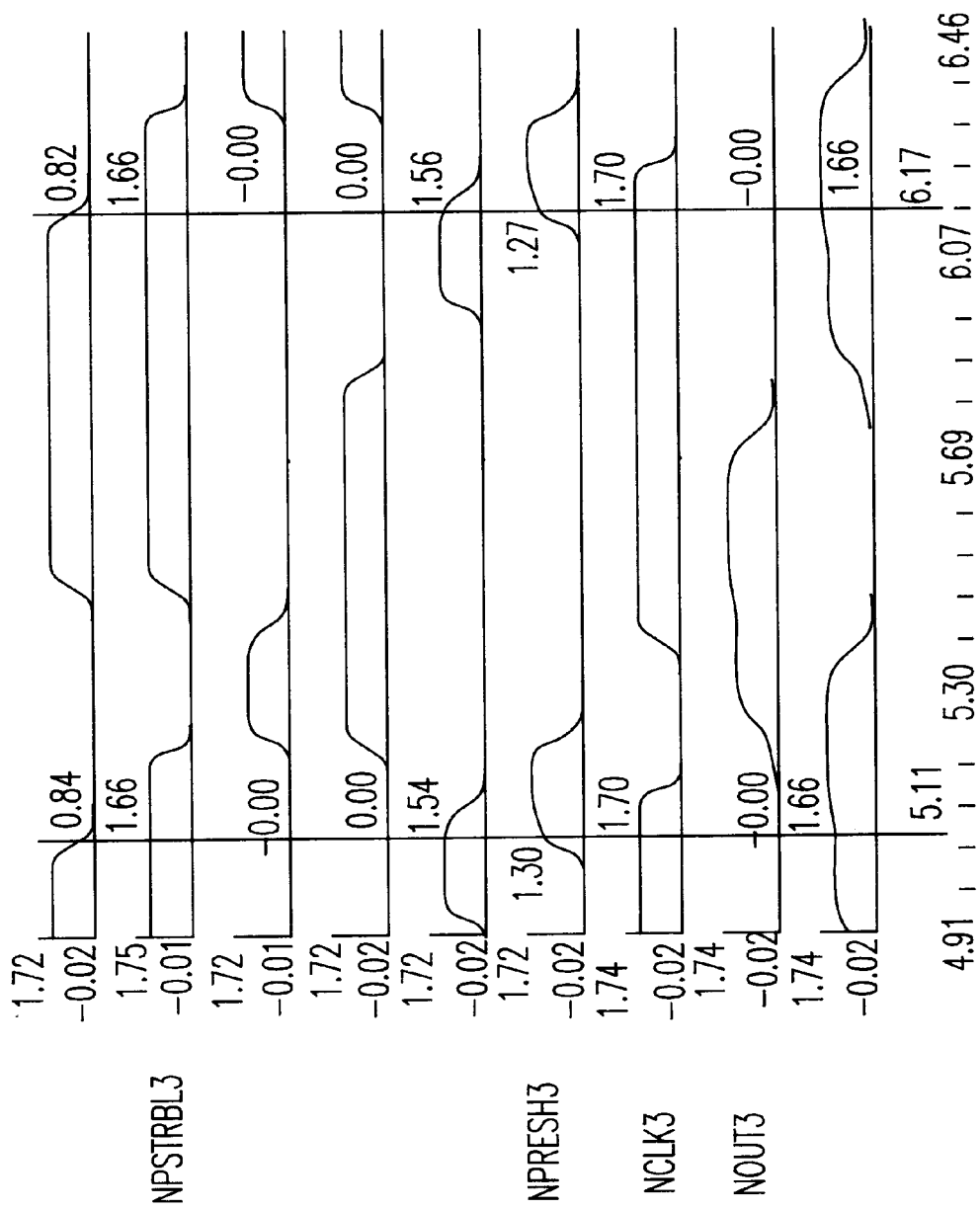
FIGS. 6 and 7 are graphs showing waveforms of cycle time and block delay for the four stage domino logic block of FIG. 4, respectively.
Figure 7:
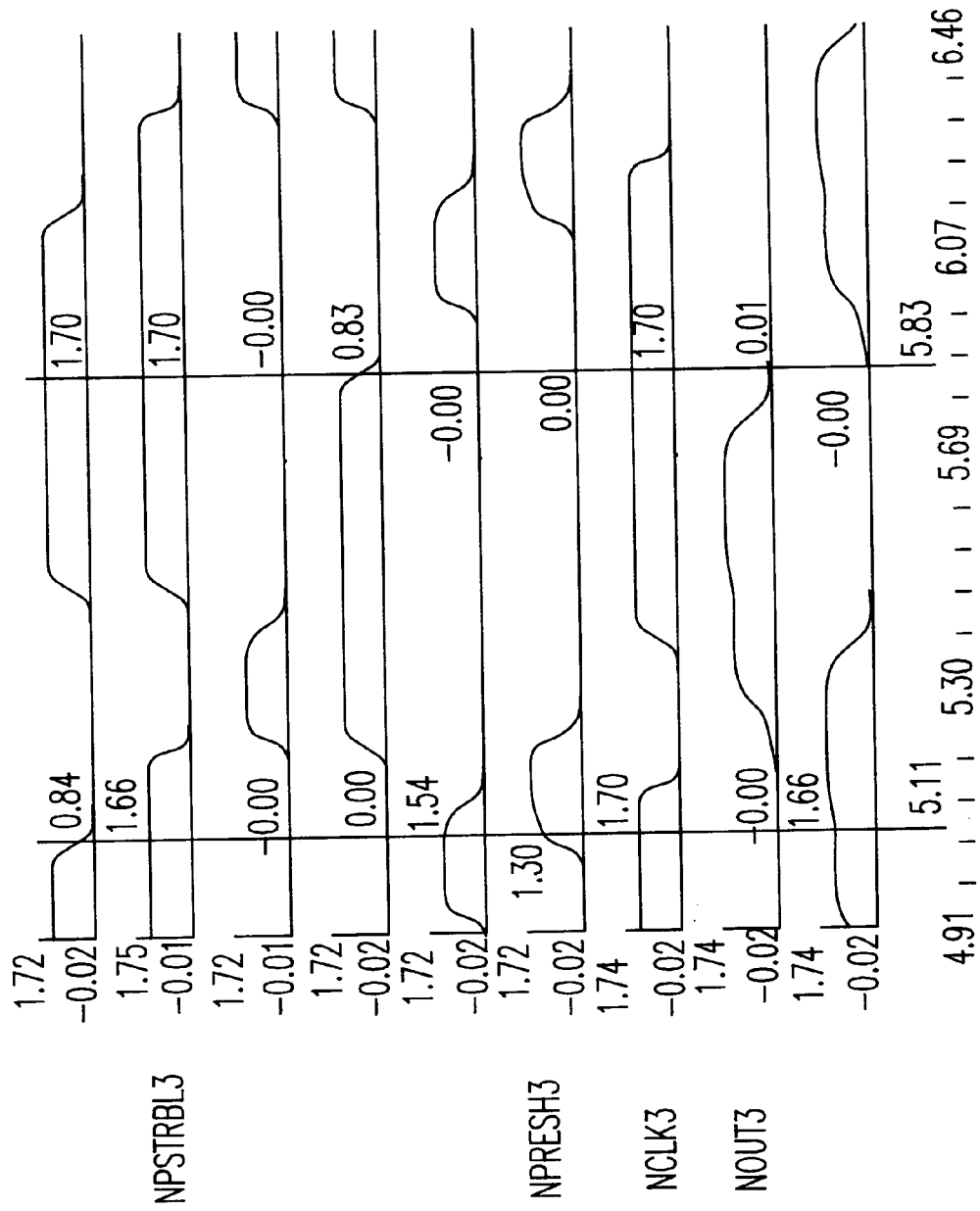
Figure 9:
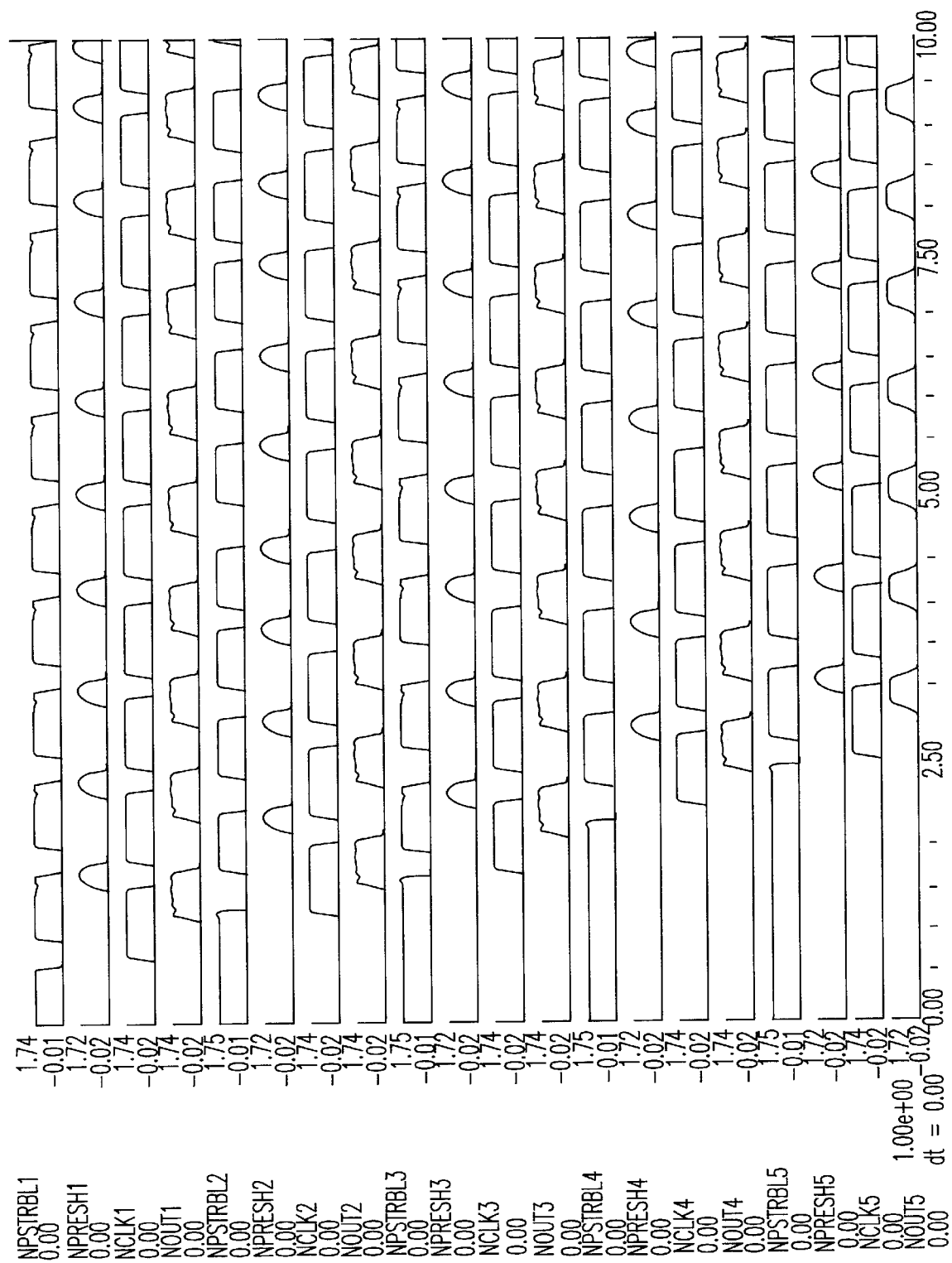
FIGS. 9 to 11 are graphs showing waveforms of the three stage domino logic block of FIG. 8.
Figure 10:
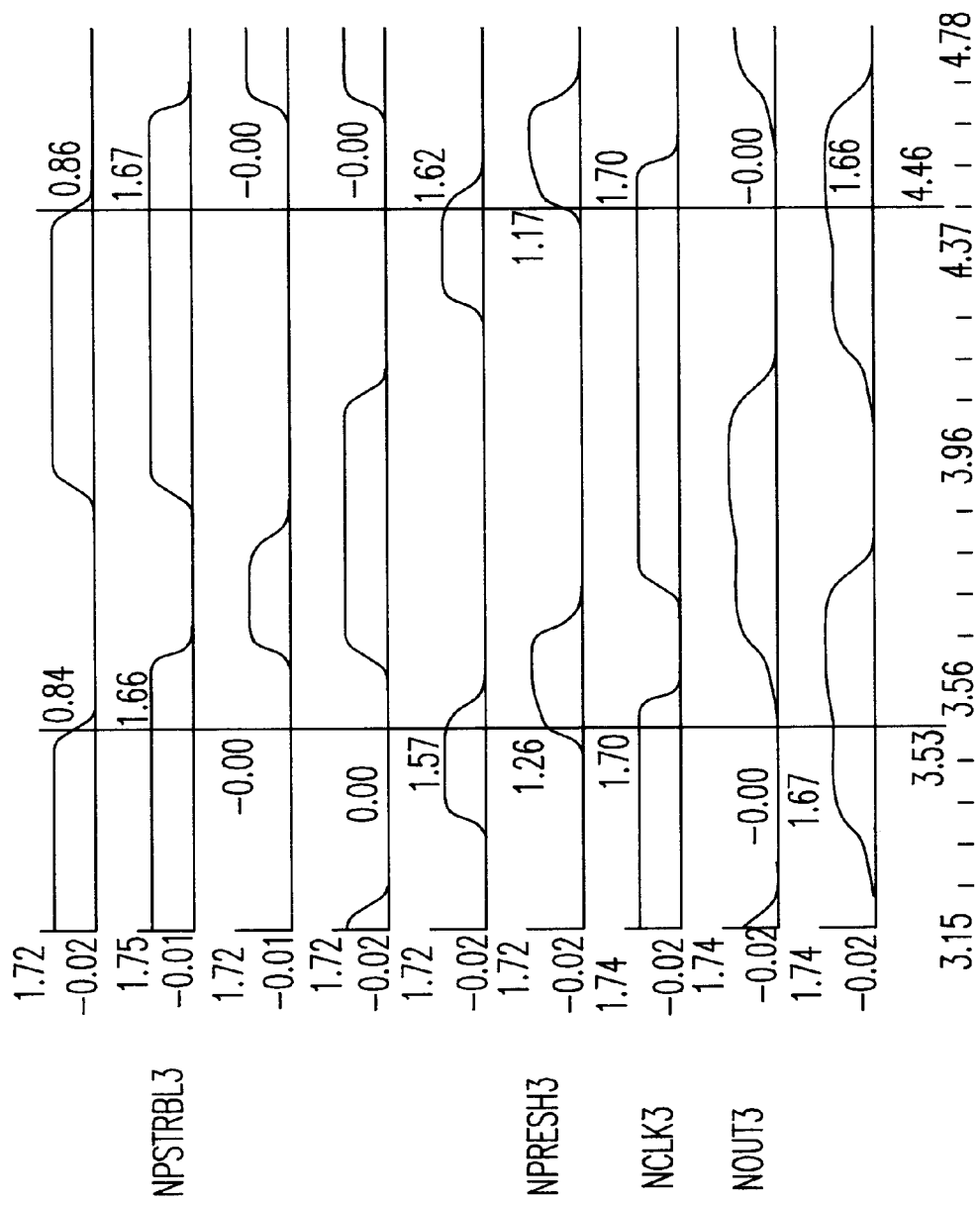
Figure 11:
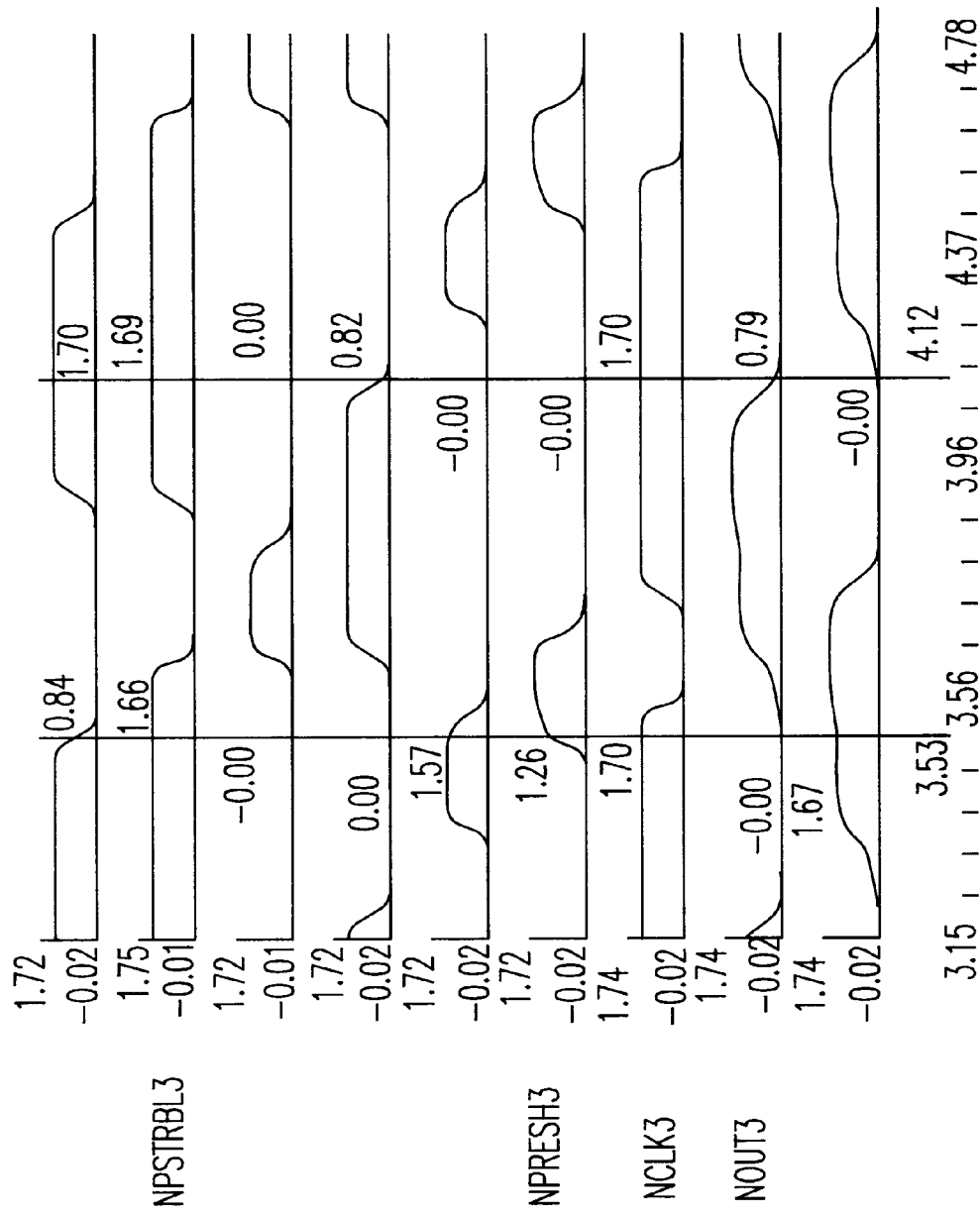

Simulated wave forms at each stage of the five stage pipeline of FIG. 3 are shown in FIG. 5. At each stage the strobe, reset, data output, and locally generated clock wave forms are shown. It can be seen from this figure how the data propagates from stage to stage in a pipelined mode. The clock for each domino stage is locally generated by the strobe and reset signals of that stage. The cycle time and macro delay for this four stage domino logic macro are 1070 ps and 720 ps, respectively, and are shown in FIGS. 6 and 7. The same simulations were repeated for the three stage domino macro of FIG. 8. The wave forms for this case are shown in FIGS. 9 to 11. What is interesting for this case where the cycle time is now 930 ps is that the clock which is locally generated from the strobe and reset signals tracks the speed increase. Reducing the domino pipe stage to one resulted in a 670 ps cycle time. The clock again tracked the strobe and reset signals.

Delay Compensation

Figure 12:
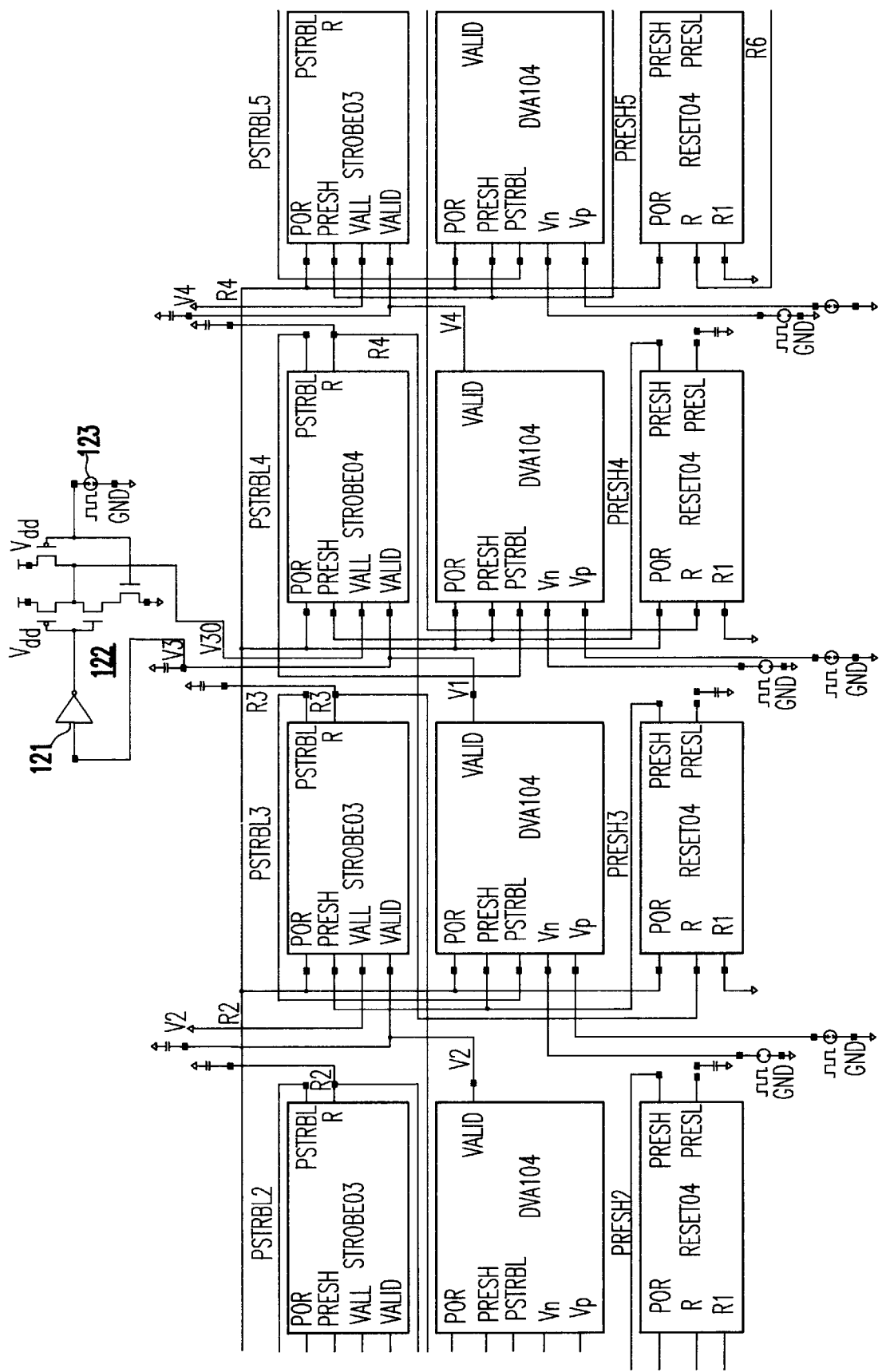
FIG. 12 is a circuit diagram showing a delay delta added to one of the stages of the global simulation model of FIG. 3.
Figure 13:
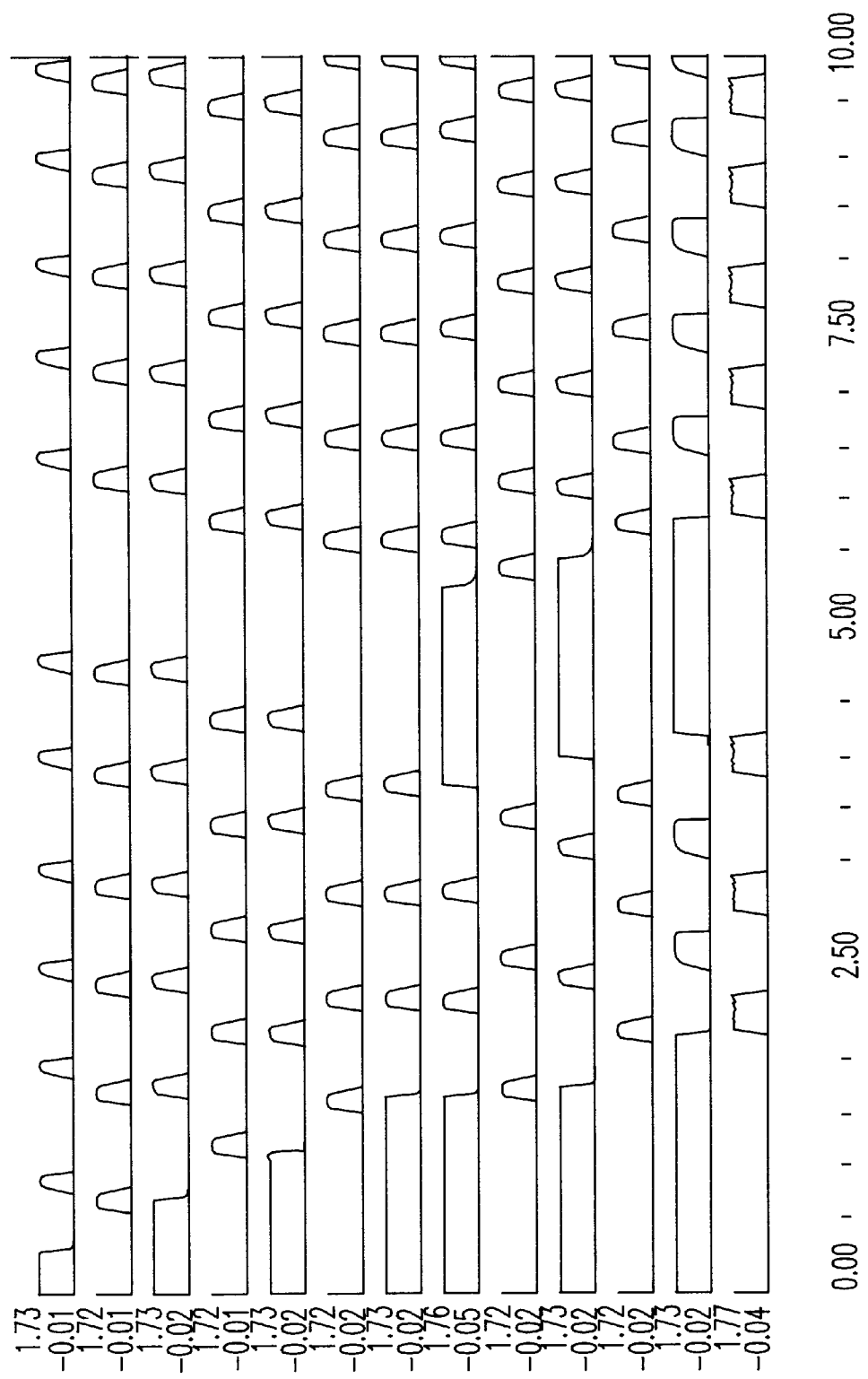
FIG. 13 is a graph showing the forward (V) and reverse (R) handshaking waveforms in response to the delay delta of FIG. 12.

With IPCMOS, any changes in delay caused by power supply noise, ACLV, parameter variations, or macro placement are automatically compensated for by the interlocked circuits. This was demonstrated in FIG. 12 where a delay delta was added to one of the stages of the global simulation model of FIG. 3. What was done was to add an inverter 121 plus a NAND gate 122 to the valid signal between stages 3 and 4 of the model. An external clock 123 was connected as shown to one input of the NAND so this path could either be closed or open depending on the external clock. The way the circuits respond when the path is opened for a period of time and then closed can be seen in the forward (V) and reverse (R) handshaking wave forms of FIG. 13. As shown in the wave forms, the valid signal between stages 3 and 4 was delayed. Data already past this point continued to advance downstream to the end of the pipe whereas data upstream from the break stopped advancing until the valid signal was allowed to propagate. Although the delay introduced was greatly exaggerated it does show how the circuits compensate for delay variations that can occur. The major point is that global variations in delay are handled by the circuits whereas in a conventional approach all potential delay variations must be understood and included in the slow path fast path analysis that is done. Accurately modeling these variations is becoming increasingly more difficult (or impossible) with increased chip complexity and higher frequencies of operation.

Delay Versus Load

Figure 14:
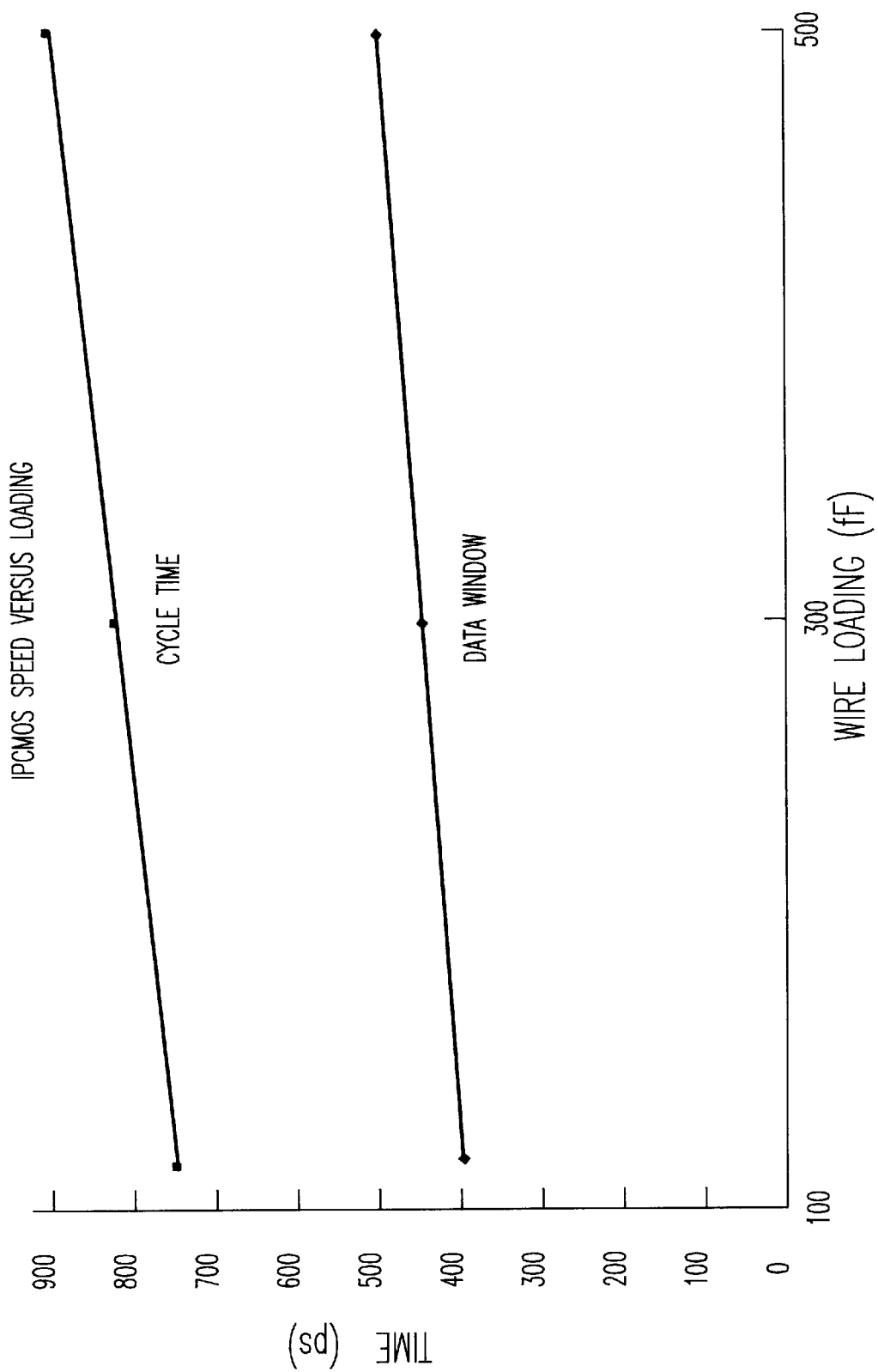
FIG. 14 is a graph showing IPCMOS speed versus loading.
Figure 15:
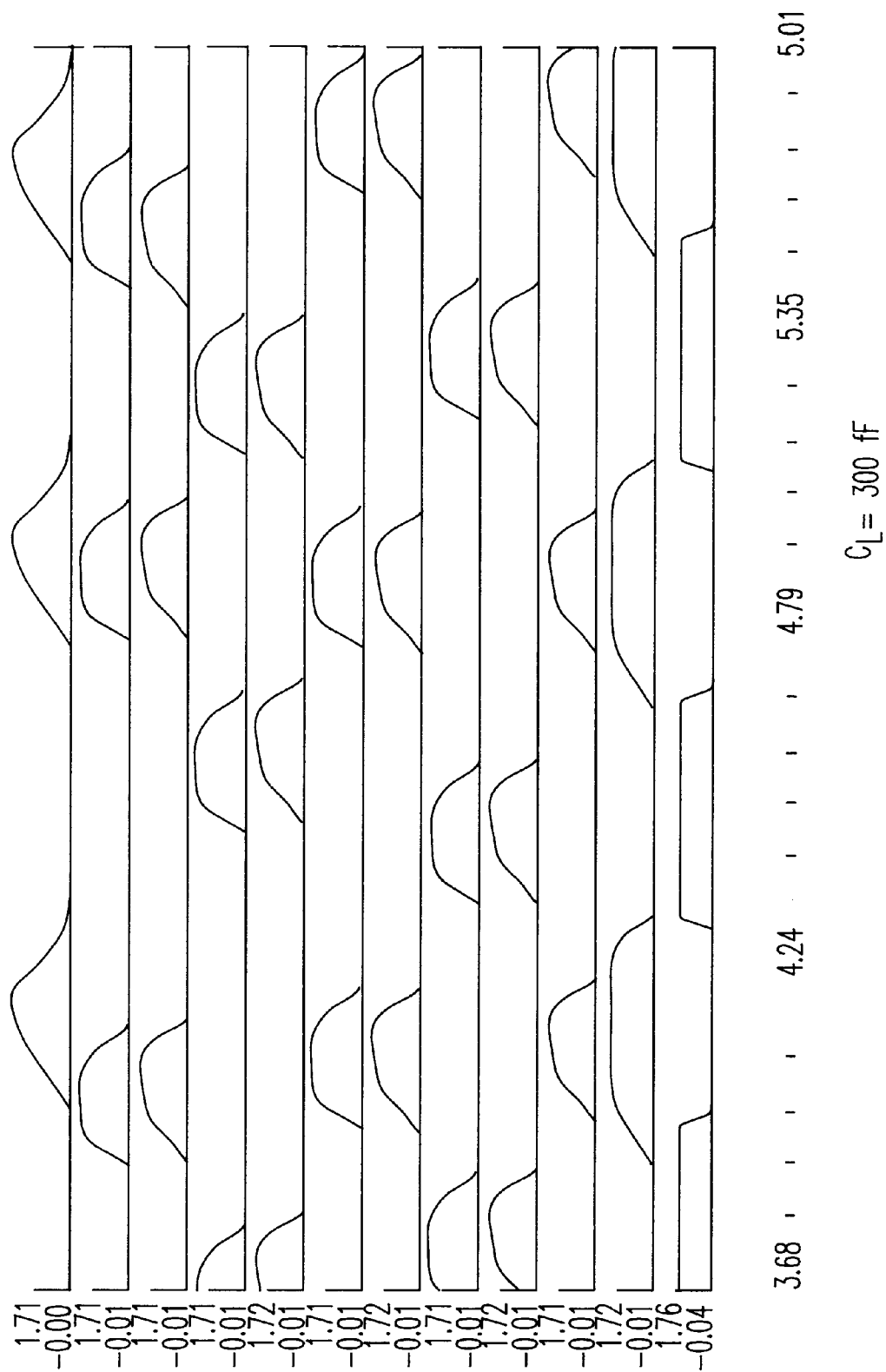
FIG. 15 is a graph showing waveforms for the handshaking signals.

The speed of the IPCMOS operation obviously depends on the load the handshaking signals have to drive. In FIG. 14, the cycle time and time it takes for the pipelined data to propagate through a macro are plotted as a function of the capacitive load of the forward and reverse handshaking signals. The wave forms for the handshaking signals for a 300 femto Farad (fF) load are shown in FIG. 15. It is apparent from the wave forms that the handshaking circuits have been designed with fairly large drive capability. This is also seen in the plot of FIG. 14 where the cycle time and macro propagation delay only increase slightly as the load is varied. Obviously this is good because one does not want the time to do the handshaking to be extremely sensitive to the load being driven.

Power

In IPCMOS, the macros are only active when an operation takes place. If there is no operation or data, the macro will be in a dormant or sleep state waiting for a handshaking signal to indicate the beginning of an operation. In applications where there are long periods of time between operations, this can result in a significant power reduction compared to a conventional system with a global clock that is running constantly. The IPCMOS approach automatically adjusts to the rate at which the system is being asked to perform operations. Anything that can be done to reduce power is important as will be seen in the next section that deals with power supply noise.

Power Supply Noise

Power supply noise (L di/dt) is becoming increasingly more of a problem with faster cycle times, higher powers, and lower supply voltages. In conventional systems with one global clock a large di/dt occurs when the clock edge that starts a cycle transitions. In IPCMOS, the clocks are generated locally for each macro and staggered in time as a result of the pipelined operation. This should result in a significant reduction in L di/dt power supply noise.

Figure 16:
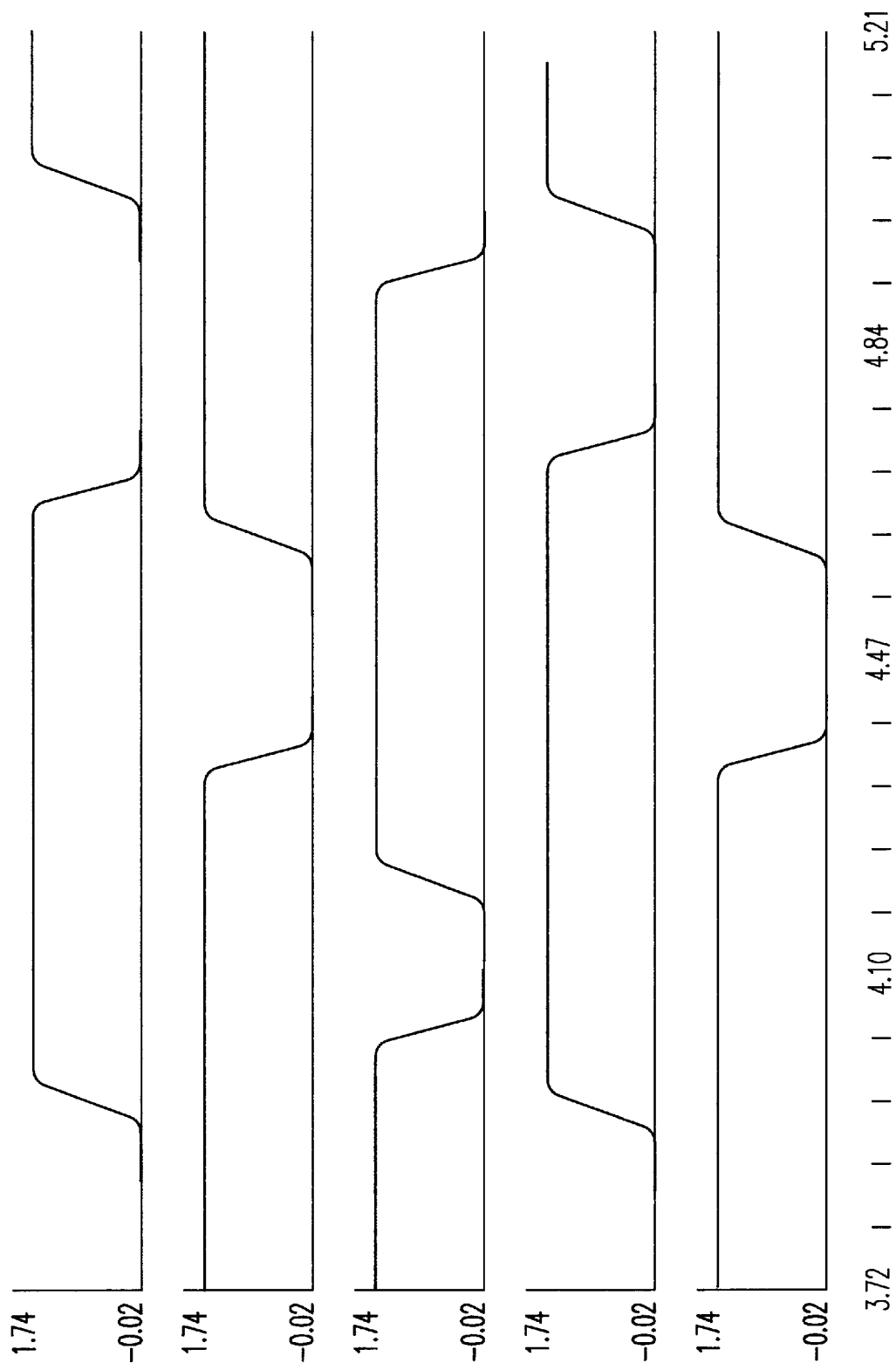
FIG. 16 is a graph showing an example of the IPCMOS local clock waveforms generated for the pipelined domino logic.
Figure 17:
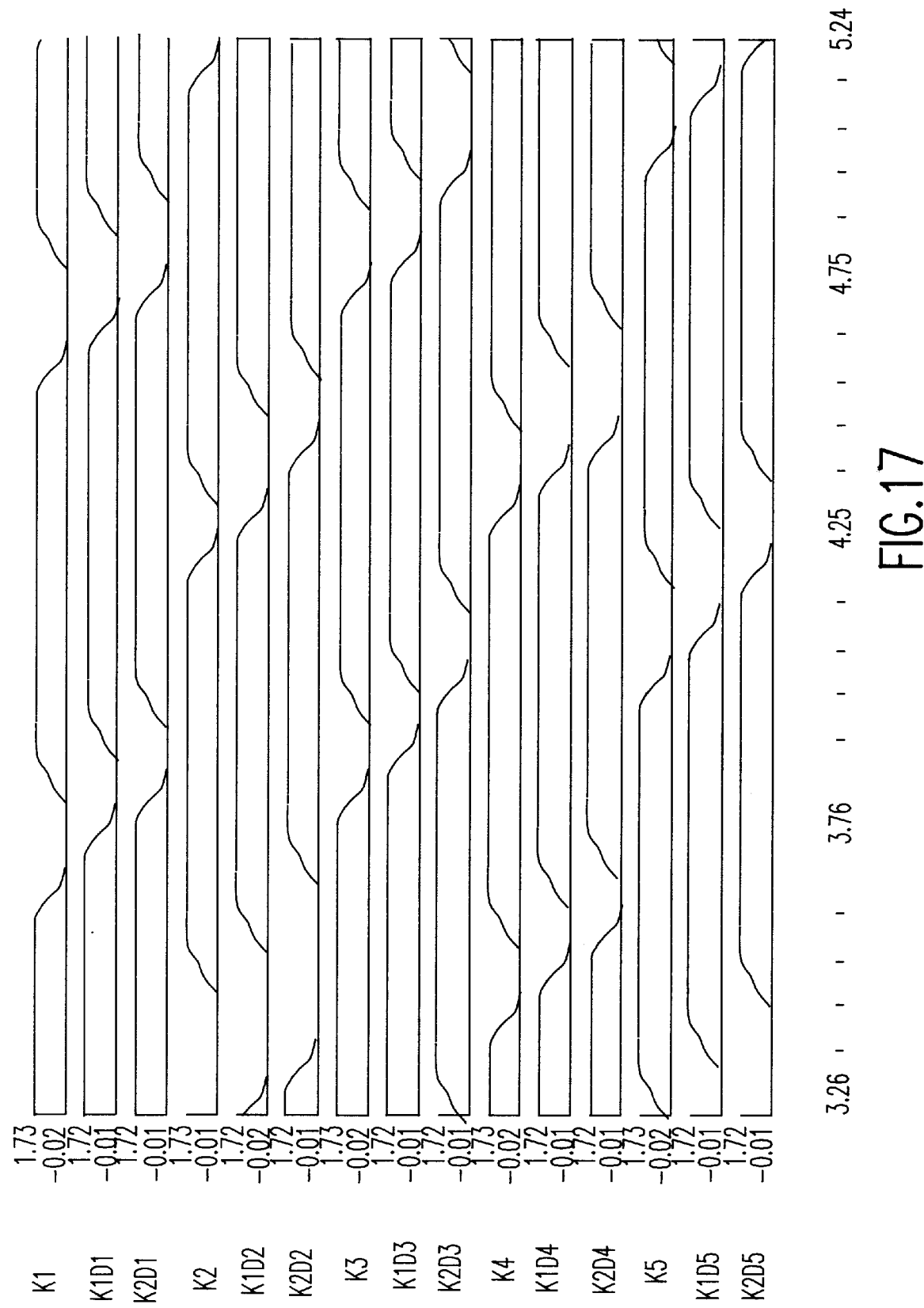
FIG. 17 is a graph showing clock waveforms where the pipeline stage consists of a three stage domino block.

An example of the IPCMOS local clock wave forms generated for the pipelined domino logic described earlier is shown in FIG. 16. These wave forms clearly show that the interlocked pipelined mode of operation results in clock transitions for each wave form that are staggered in time reducing the peak di/dt compared to the conventional approach with a global clock. It should be noted that only the clock wave forms are shown but the other handshaking signals and strobes and resets also are staggered in the same manner. In addition if more than one domino stage is used in each pipelined stage (FIGS. 4 and 8), it is possible to stagger the clock wave forms even more by buffering the clock between the domino stages. The clock wave forms where the pipeline stage consists of a three stage domino macro are shown in FIG. 17. These clocks and buffered clocks are further staggered in time which should help reduce the L di/dt noise even more. The IPCMOS approach where the clock loads that are being driven are staggered in time also makes it easier to design the drivers for fast rise times on the clock transitions.

Strobe Circuit

Figure 18:
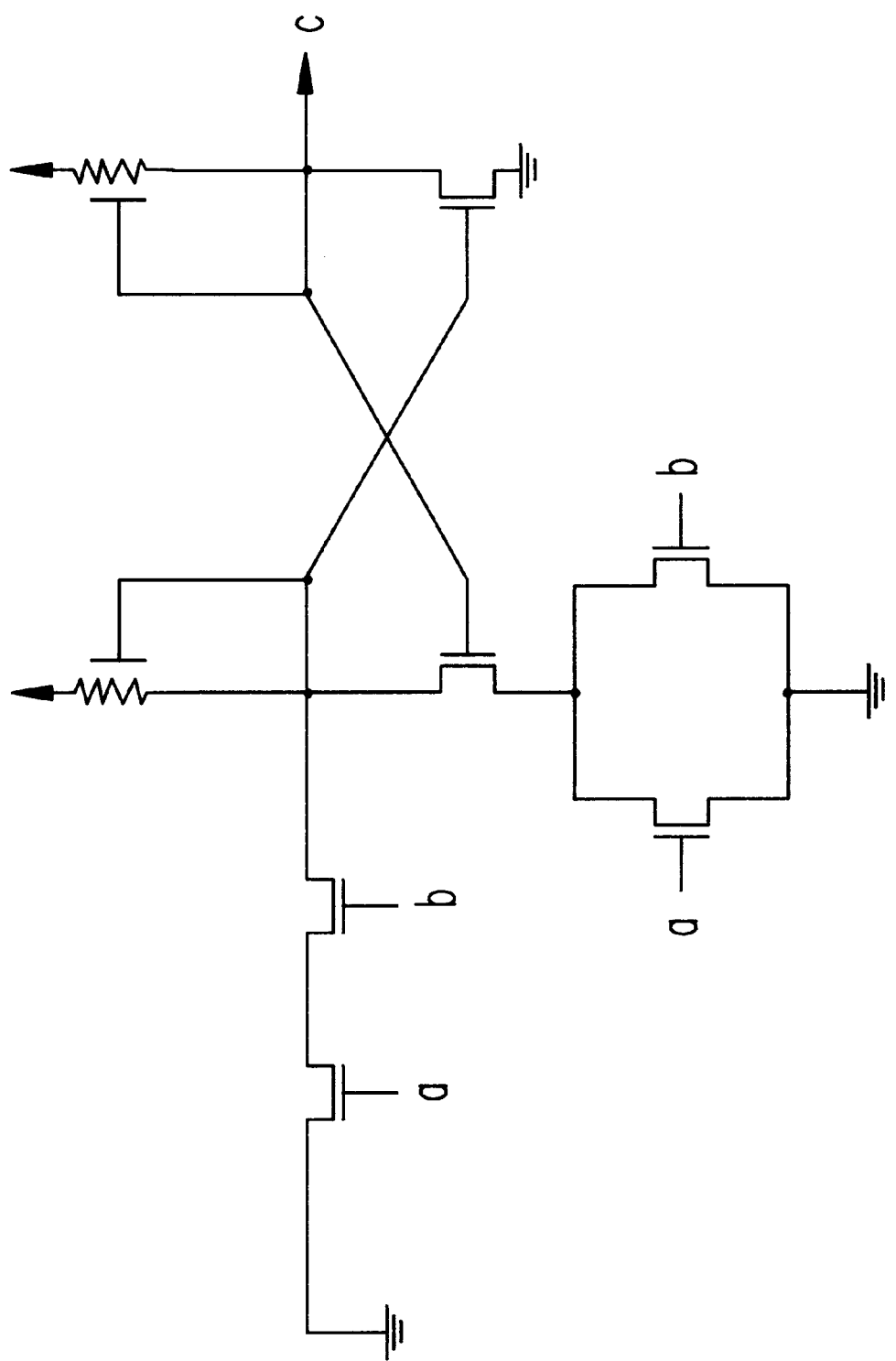
FIG. 18 is a circuit diagram of a Muller C-element circuit.
Figure 19A:
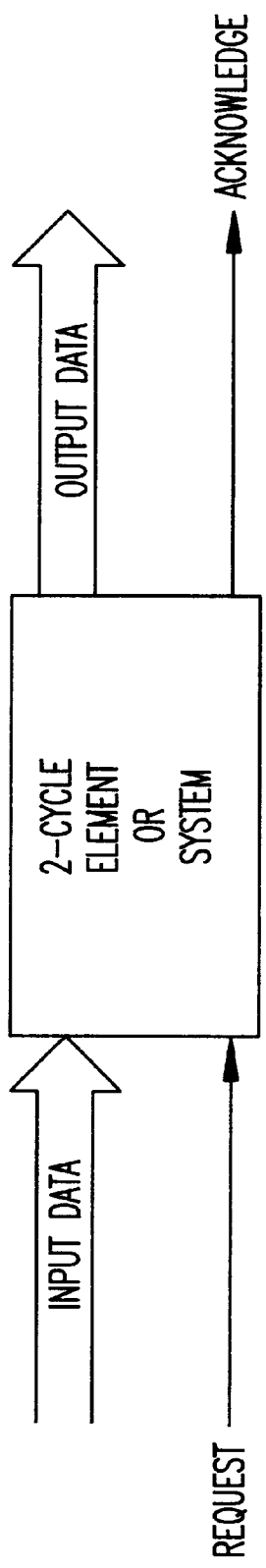
FIG. 19A is a block diagram of an element of system supporting self-timed two-cycle signaling.
Figure 19B:
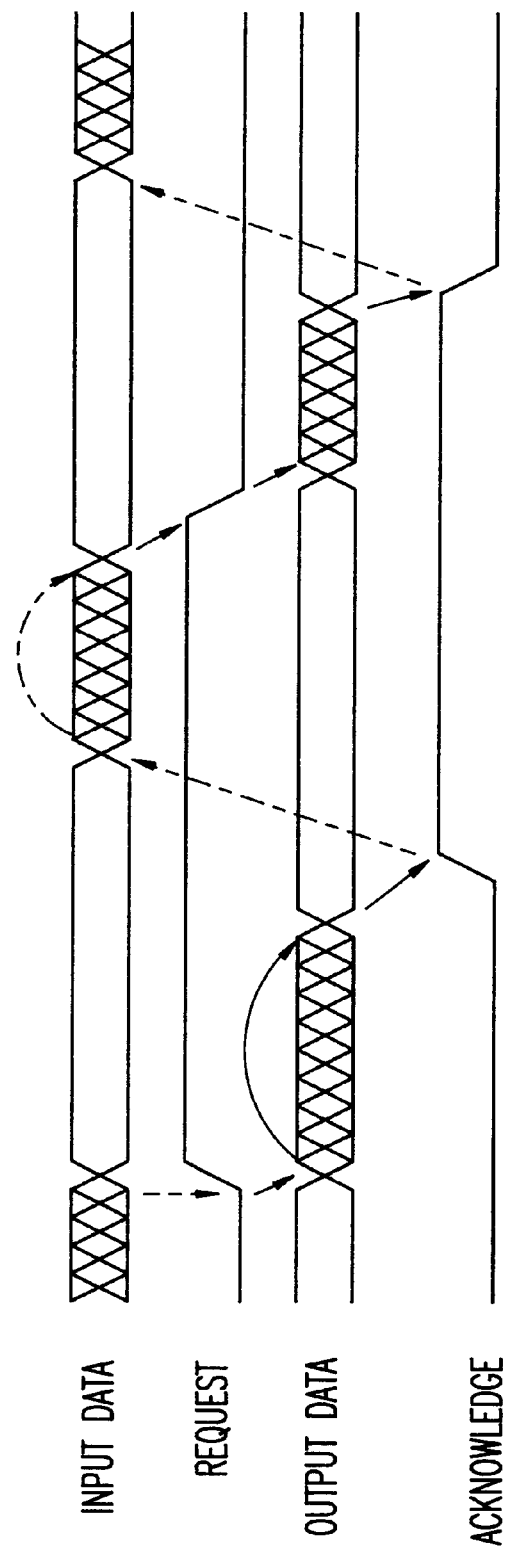
FIG. 19B is a graph showing the operation of the element or system of FIG. 19A.

The advantages of IPCMOS compared to previous approaches are first the ability to do handshaking between multiple macros at a very high speed and secondly to do it in a manner that allows the macros to operate in a pipelined mode of operation. How this is accomplished is seen from the circuits used to implement the handshaking and pipelining. The first of these circuits to be described is the Strobe shown in FIGS. 20A and 20B. The Strobe circuit has as its inputs the valid signals coming from upstream macros and a reset that comes from the downstream macros. It performs a unique AND function when all the inputs have gone low and when all the inputs have gone high. Unlike the Muller C-circuit shown in FIG. 18, the inputs do not have to overlap in time. Non-overlapping signals can occur when macros with more than one input and output and different speeds are interconnected. In IPCMOS, this strobe circuit will keep track of what cycle transitions in the inputs occur in. This is crucial to avoiding errors in the handshaking. In order to understand the operation of the Strobe circuit it is perhaps easiest to start at the end of a cycle when the external valid signals (V1–Vi) shown in FIG. 20A will all be low, switch 201 will be open, and the internal valid signals (Vint1–Vinti) will be high. The circuit details of switch 201 are shown in FIG. 20B. The strobe (PSTRBL) will fire or go low again only when all of the internal valid signals (Vint1–Vinti) go low. Each Switch 201 that is between the external valid signal and the internal valid signal will close only when its external input V goes high. Since all the switches 201 are independent from each other, each valid signal must transition high to close the switch on its input. This prevents an error from occurring where a valid signal from the previous cycle on one input is still low because the macro where it originates has not been reset but having all the other valid signals reset high and then transition low causing the strobe to fire based on old data on an input.

In order for the internal valid signal Vint (which is precharged high at the end of the cycle) to go low, the external valid signal must first transition high turning on Switch 201 and then transition low. When the external valid signal transitions low, the internal valid signal Vint is also discharged to a low state through the pass transistor of Switch 201. Node X of the macro will transition high only when all the internal valid signals go low. When this happens, the outputs of the Strobe circuit R and PSTRBL will transition high and low respectively. Since all the external valid signals are low, R transitioning high will turn Switch 201 off. It is also the reverse handshaking signal to the upstream macros that data has been received and they can reset. Immediately after R turns Switch 201 off, PSTRBL will precharge each of the internal valid nodes (Vint) to a high state resetting the strobe function. PSTRBL also pre charges Cs high. Cs high prevents the Strobe circuit from firing again until there is a reset or handshake from the downstream macro stating it is ready to receive more data. Thus, the Strobe function is interlocked with upstream macros by the valid signals and with downstream macros with the reset signals.

Figure 20A:
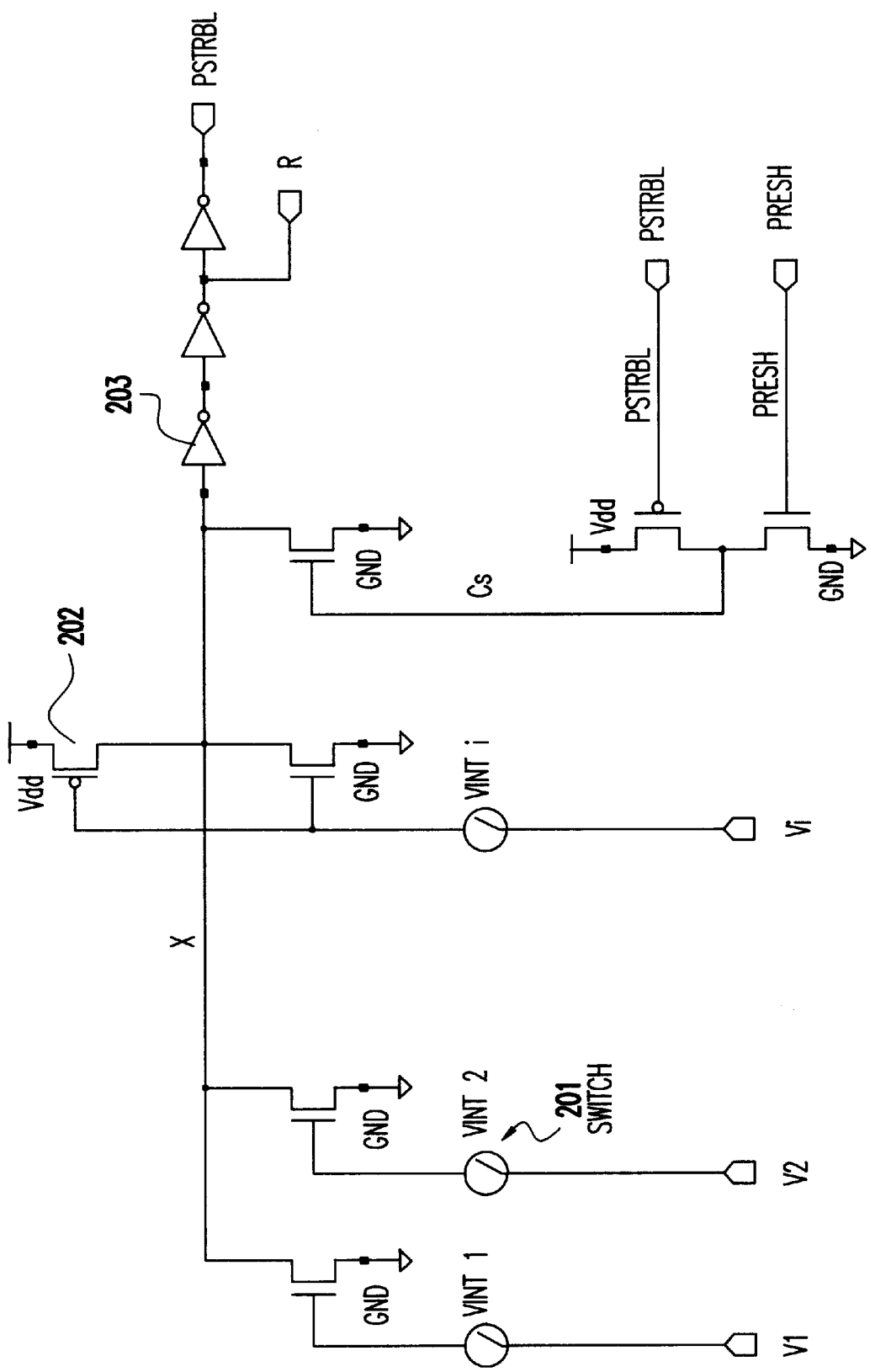
FIG. 20A is a circuit diagram of a strobe circuit.
Figure 20B:
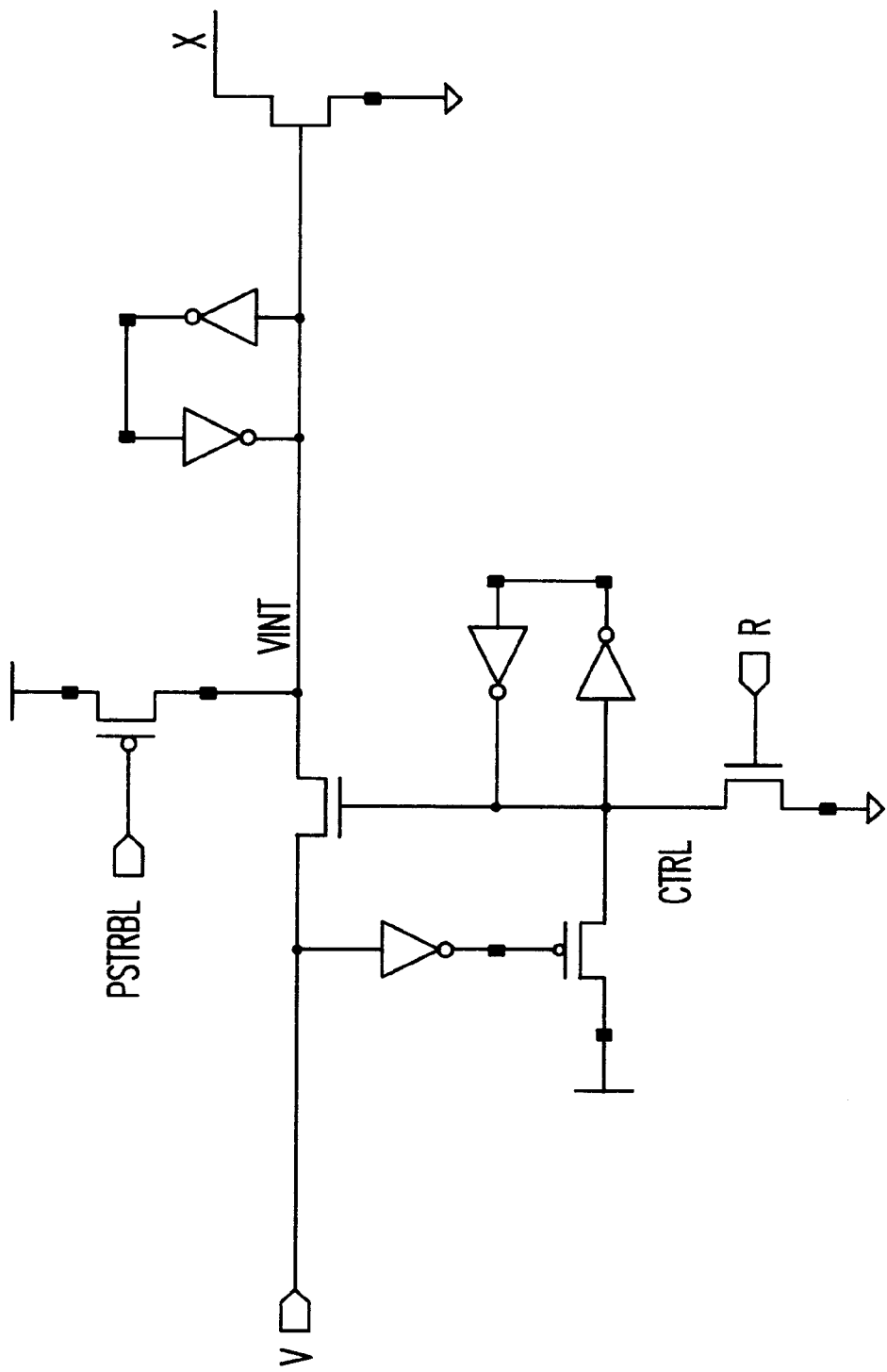
FIG. 20B is a circuit diagram of a switch used in the strobe circuit of FIG. 20A.

In the Strobe circuit of FIG. 20A, the p-channel load device 202 of the NOR gate is connected to only one internal valid signal. This valid signal that the load is connected to should be the latest arriving valid signal to minimize power. If in actual operation another signal arrives last, the circuit will function normally but there will be some additional power dissipation during the time the NOR gate is conducting current. Also for large fan-ins, it may be better to replace the inverter 203 connected to node X by a NAND gate so the inputs can be shared between two branches instead of one.

Figure 21:
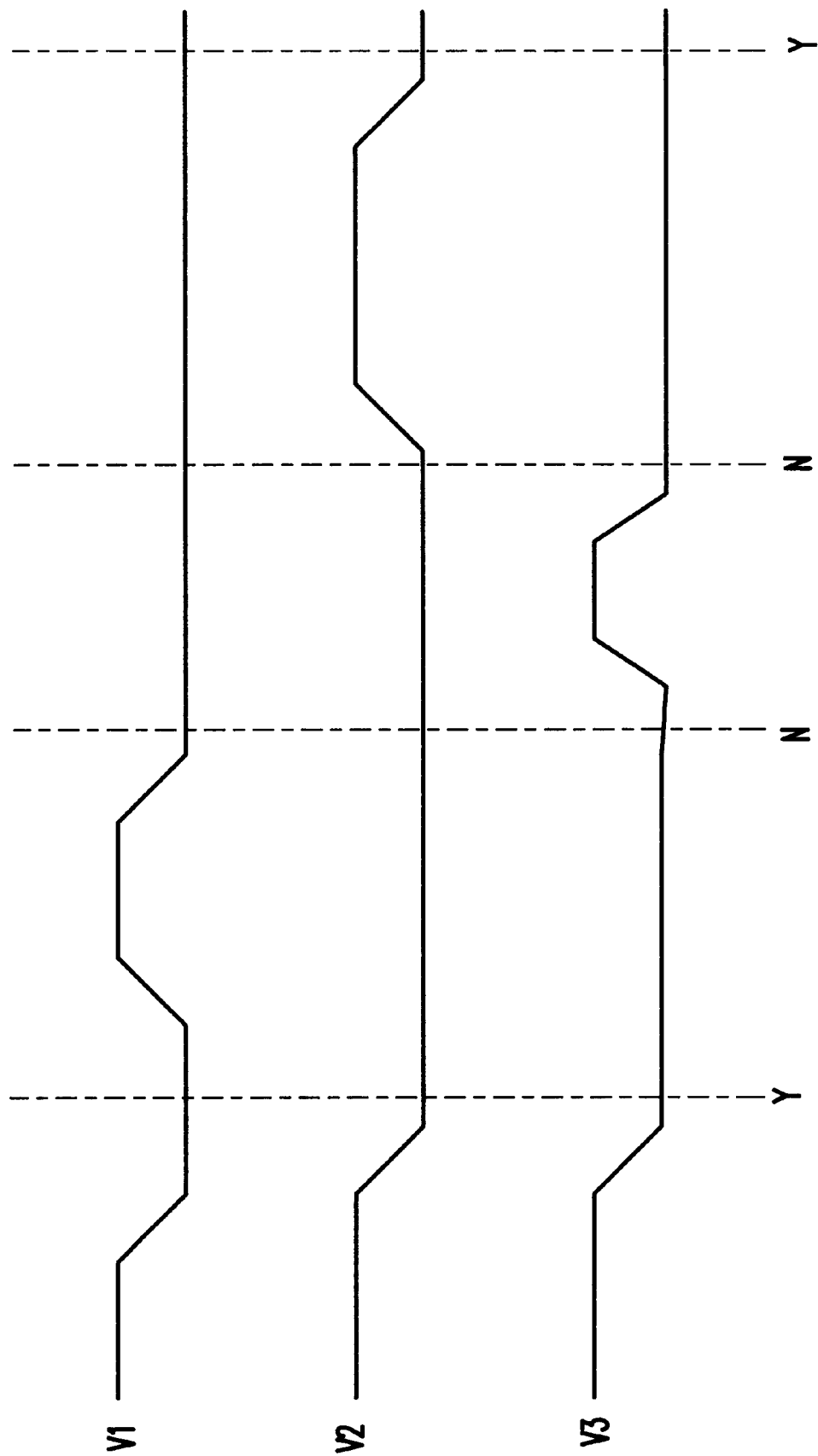
FIG. 21 is graph showing waveforms illustrating the operation of the strobe circuit of FIG. 20A.

The unique way the Strobe circuit ANDs the valid inputs and at the same time keeps track of the cycle they occur in is seen in the waveforms of FIG. 21 for three valid signals. Initially all the external valid signals are assumed to be high. They all transition low at roughly the same time and the Strobe generates an output (indicated by a Y). Then the external valid signal V1 transitions high and low while V2 and V3 remain low. Now all the external inputs are low but the Strobe circuit does not generate an output (indicated by a N). This same pattern is repeated for the external valid signal V3 with no output from the Strobe circuit (indicated again by a N). Only when the external valid signal V2 also transitions does the Strobe fire again (indicated by a Y). The Strobe circuit keeps track of each input and will not generate an output until all the inputs have transition from a low to a high and back to a low. Thus, the Strobe keeps track of the cycle in which the valid signals occur.

Figure 22:
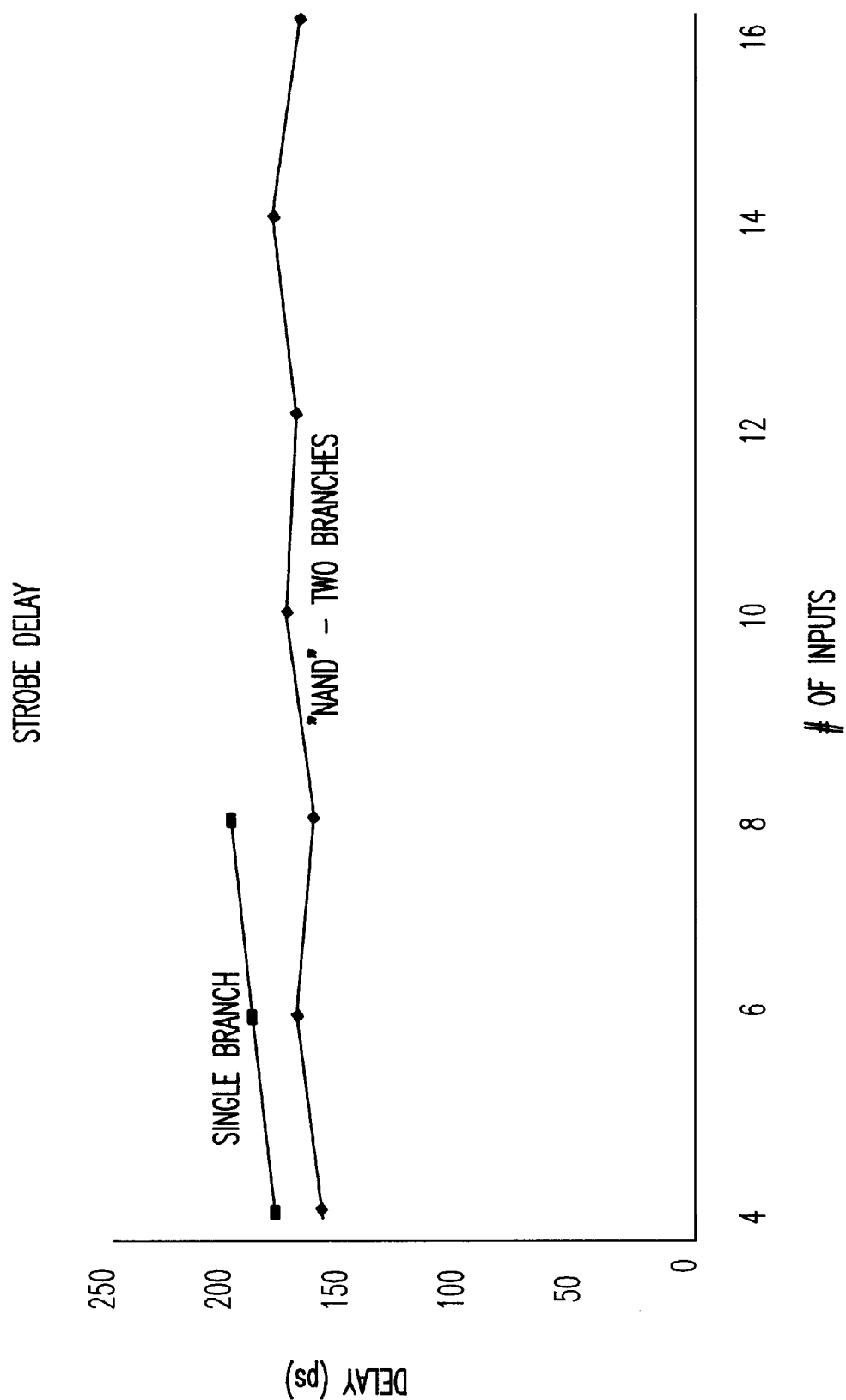
FIG. 22 is a graph showing the strobe delay as a function of the number of inputs.

One would like the delay through the Strobe circuit of FIG. 20A to be fast and relatively insensitive to the number of inputs. A plot of Strobe delay versus the number of inputs is given in FIG. 22 for the case of a single branch and two branches (NAND). Further optimization is possible with the Strobe circuit, but as indicated by the plot, the delay of the circuit is very fast and relatively flat with increasing numbers of inputs—the desired result.

Reset Circuit

The Reset circuit does the handshaking function on the reset signals coming from the downstream macros. As will be described, in a similar manner to the Strobe circuit the Reset performs a unique AND on these signals and keeps track of the cycle in which the signals occur by means of a built in cycle counter. The reset signals from the downstream macros are separated from the internal nodes of the reset circuit by a switch as shown in FIGS. 23A and 23B.

Figure 23A:
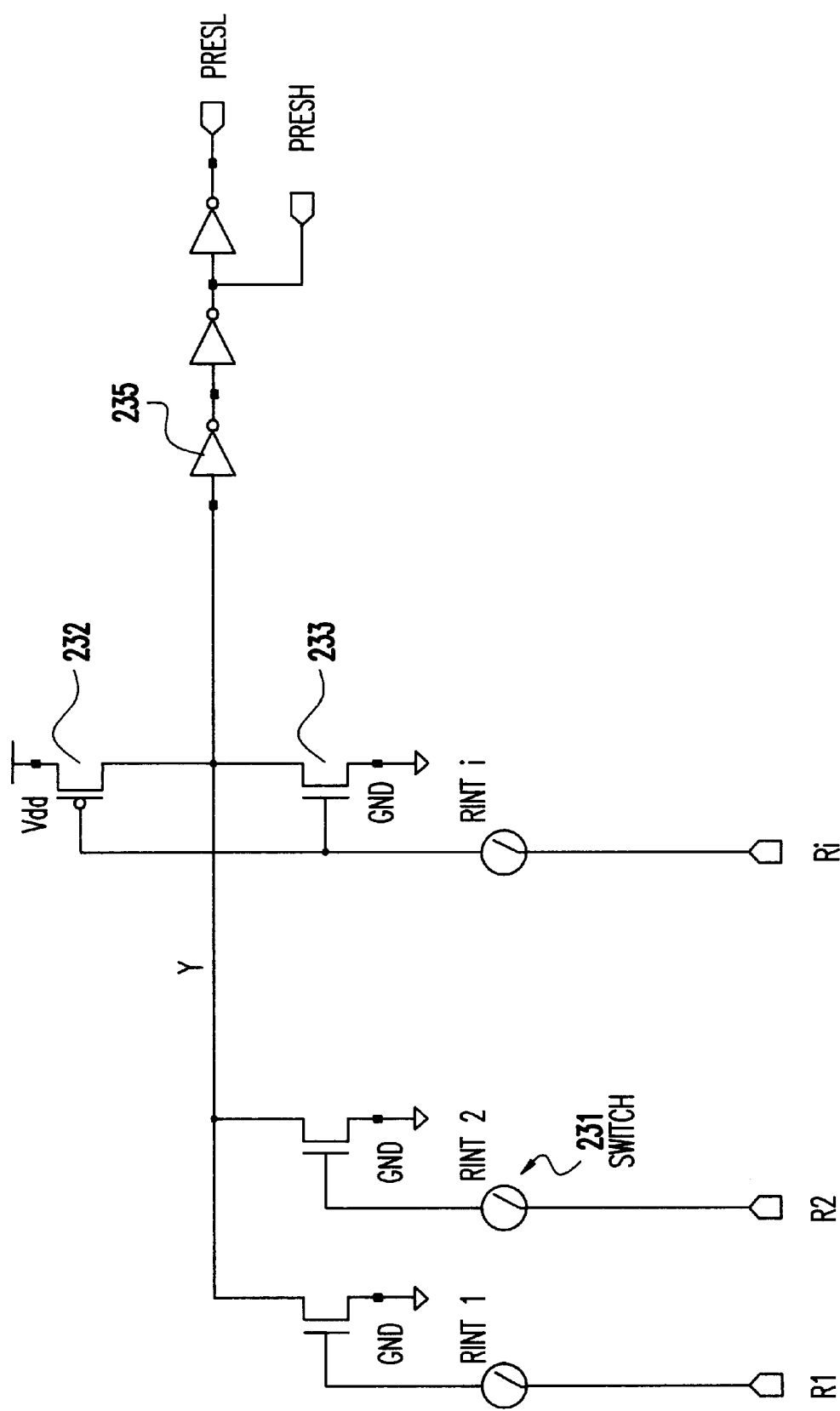
FIG. 23A is a circuit diagram of the reset circuit.

The Reset circuit shown in FIG. 23A has as its outputs PRESH and PRESL. At the end of a cycle, the external reset signals R1 to Ri to Switch 231 (shown in FIG. 23B) will be low, the internal nodes Rint1 to Rinti will have been precharged high, PRESH will be low, and PRESL will be high. The external reset signals come from the Strobe circuit of FIG. 20A. These signals are positive going pulses. All the internal input nodes of the Reset circuit Rint1 to Rint1 must transition low before node Y will transition high. In order for this to occur, each external reset signal must transition high. Since PRESL is high, an external input R pulsing high will cause the internal node Rint to discharge to a low level. When R goes low the state of Rint is held on the small capture latch. Once all the internal Rint inputs go low, the macro will fire with Y going high and PRESH going high and PRESL going low. PRESL transitioning will precharge all the internal Rint nodes high. This in turn will cause PRESH to go low and PRESL to go high, and the macro is ready for another cycle to begin.

Figure 23B:
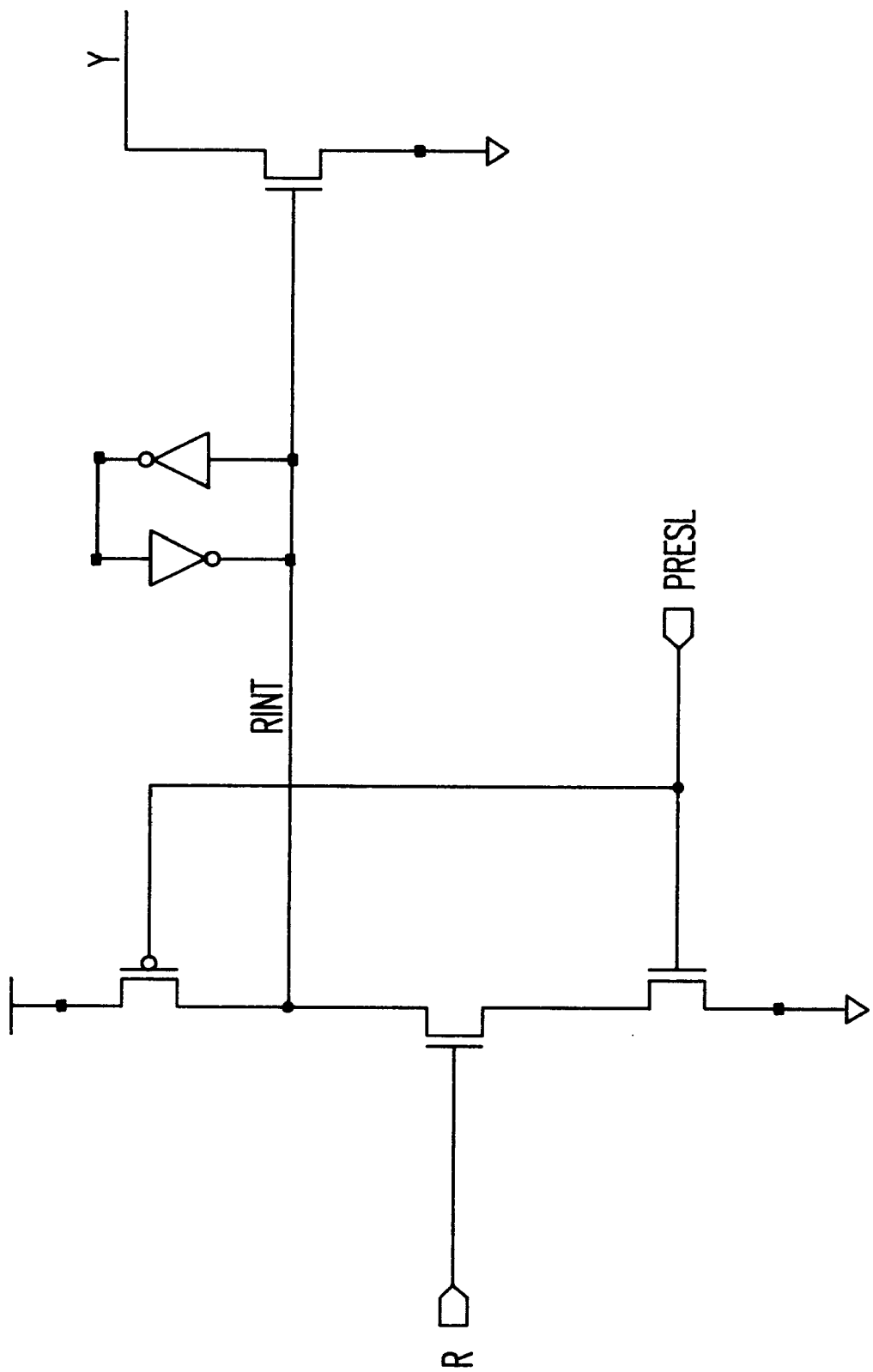
FIG. 23B is a circuit diagram of the switch used in the reset circuit of FIG. 23A.

The reason that PRESL is connected to both the p-channel precharge device 232 and the n-channel pull down device 233 in FIG. 23B is to make sure if a pulsed external reset input is still high when PRESL goes low, the path to ground is open so that Rint can be precharged. Since R and PRESL are pulsed signals with approximately the same pulse width, this eliminates the possibility of attempting to discharge and precharge the internal reset node Rint at the same time. For high fan-in, the first inverter 235, shown in FIG. 23A, driven by node Y could be replaced by a NAND stage with the input load distributed on two branches instead of a single branch.

Figure 24:
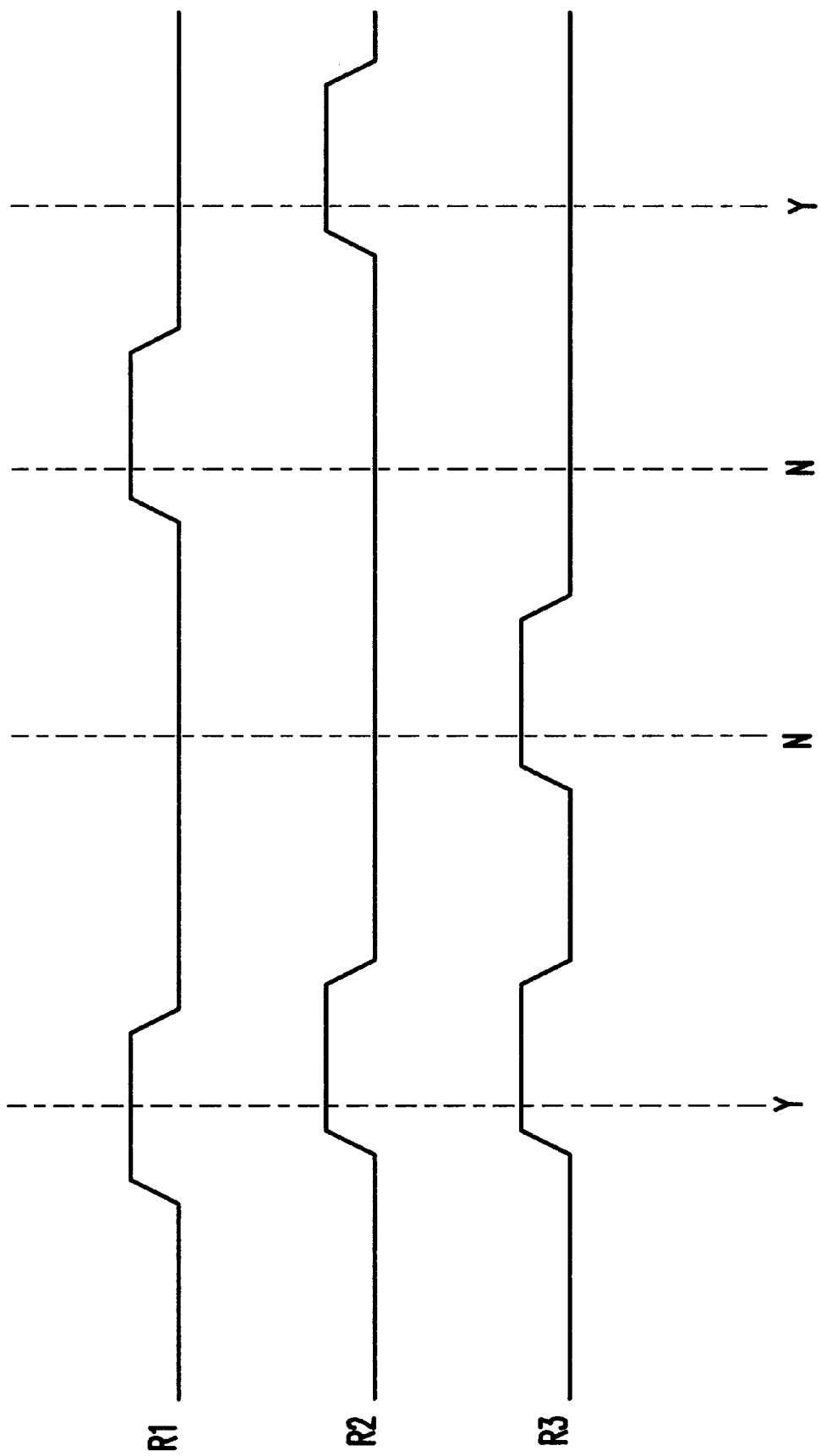
FIG. 24 is a graph showing waveforms illustrating the operation of the reset circuit of FIG. 23A.
Figure 25:
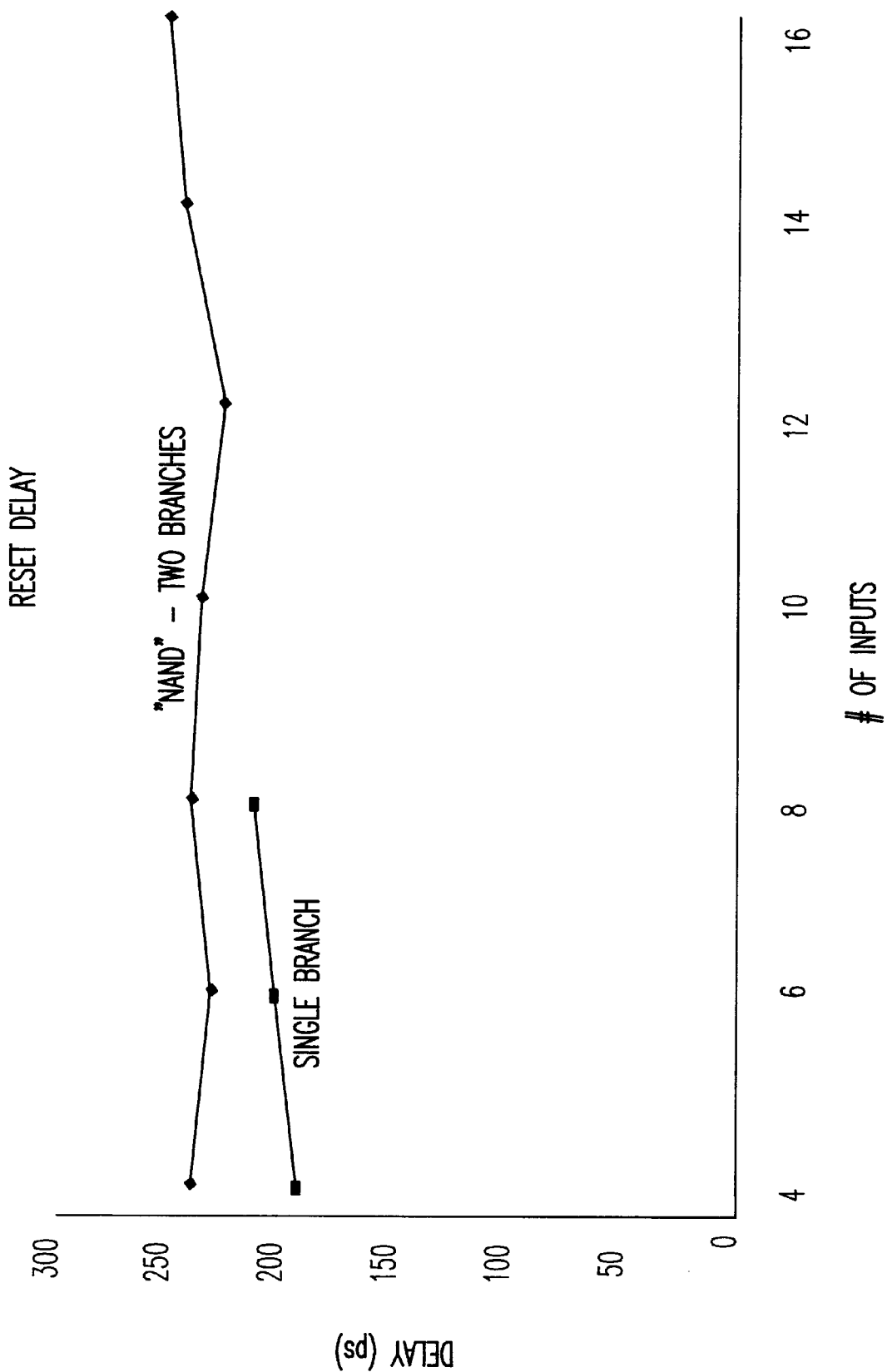
FIG. 25 is a graph showing the reset delay as a function of the number of inputs.

The unique way the Reset circuit ANDs the pulsed overlapping or non-overlapping external inputs and keeps track of the cycle for each of the signals is seen in the wave forms for the three input Reset circuit shown in FIG. 24. The case for both overlapping and non-overlapping pulses is given in the wave forms. The first case shown is the one where the external input pulses R1 to R3 overlap. The Reset circuit will perform an AND when all three inputs pulses reach a high level. For the case where the pulses do not overlap the circuit will perform an AND only after all three inputs have transition even though the other two inputs have gone low. This is accomplished by having a switch between the external and internal inputs so they can have different values and by pre charging the internal inputs high at the end of each cycle. The delay through the Reset circuit is very fast as can be seen from the plot of delay versus the number of inputs for the case of one and two branches in FIG. 25.

Valid Circuit

Figure 26:
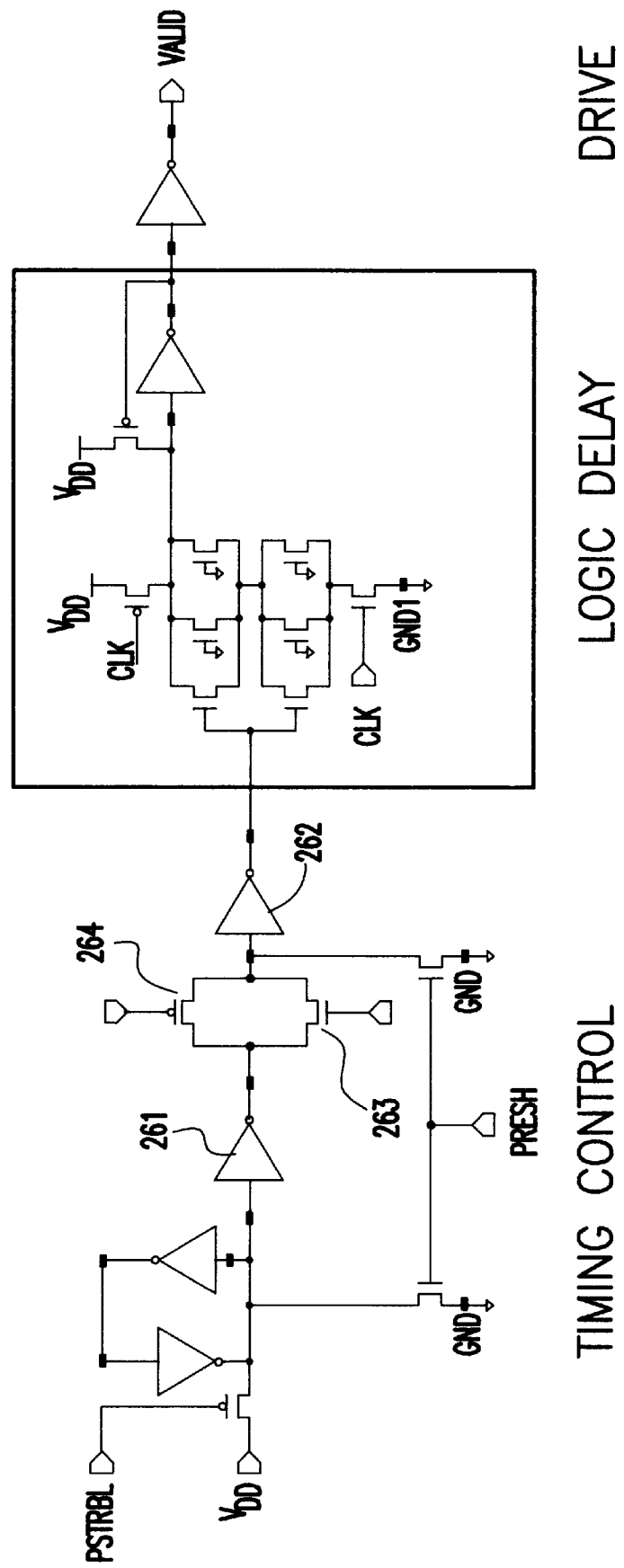
FIG. 26 is a circuit diagram of an example of a Data Valid circuit.

The handshaking in the forward or downstream direction requires that each group of data outputs from a macro have a valid signal. Both the valid signal and data for a particular macro are initiated by the strobe. The time it takes to generate data valid signal plus the time it takes to generate the strobe must be equal to or greater than the time it takes for the slowest data output to occur. This guarantees the data will be valid when the strobe captures the data. An example of a Data Valid circuit is shown in FIG. 26. One wants the delay for the valid signal to track the timing for the logic as much as possible. The Valid circuit of FIG. 26 was used with the domino stages of FIGS. 4 and 8 in the model of FIG. 3. For this case, the logic delay for the valid stage comes from the same domino stage as used in the normal data paths. Therefore, there should be excellent tracking with parameter and supply voltage variations between the data and valid signal The valid signal is guaranteed to transition each cycle by resetting its internal node to a low level at the end of a cycle with PRESH and then charging the internal node to a high level at the beginning of the cycle with PSTRBL as shown in circuit diagram of FIG. 26. Since the domino stage(s) used for the logic delay will be pre charged high each cycle the high input on the internal node will cause the domino stage to discharge during the evaluate portion of the cycle and Valid will transition low each cycle. Two inverters 261 and 262 with n and p pass gates 263 and 264, respectively, separating them have been placed between the internal node and the input to the domino stage. These two pass gates with their gates brought out to separate supply voltages provide a means for adjusting the delay through the Data Valid stage.

Figure 27A:
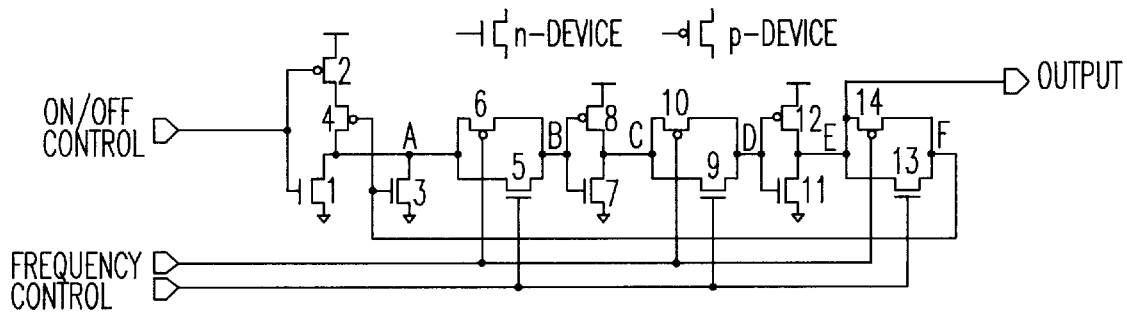
FIG. 27A is a circuit diagram of a Voltage Controlled Oscillator (VCO)
Figure 27B:
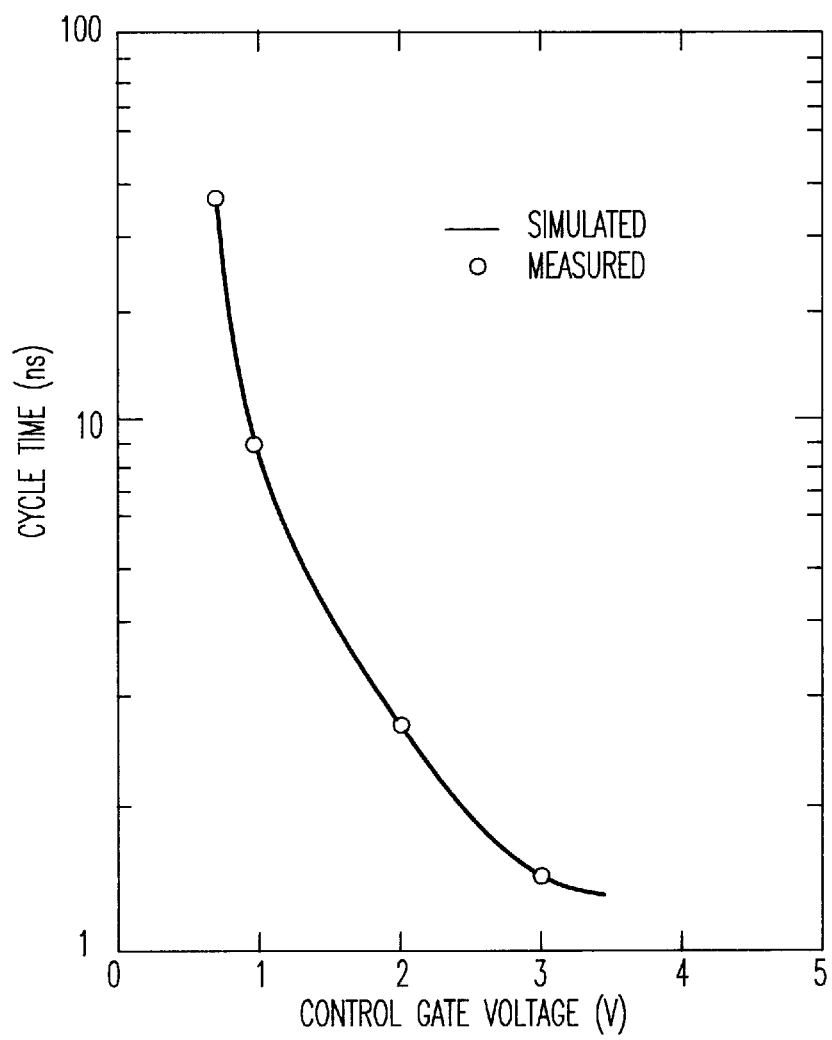
FIG. 27B is a graph of the VCO cycle time versus control gate voltage.

A similar technique was incorporated in the voltage controlled oscillator (VCO) shown in FIG. 27A that was part of the on-chip test circuitry used to test a high speed SRAM. See "On-Chip Test Circuitry for a 2-ns Cycle, 512-kb CMOS ECL SRAM", by Stanley E. Schuster et al., *IEEE Journal of Solid-State Circuits*, Vol. 27, No. 7, July 1992. As shown in FIG. 27B, the cycle time or speed can be adjusted over a wide range with the control gate voltage of the pass gates. It is highly desirable to be able to adjust the valid signal delay. If the strobe, which has as its inputs the valid signals, transitions before the input data to the macro has reached its final state an error will occur. Therefore, the ability to adjust the timing of the valid signals is important. This way of adjusting the valid signal timing requires analog voltages to change the resistance of the pass gates. Other approaches that are digital in nature such as switching stages in or out of the valid logic could also be used. The important thing is to be able to adjust the delay during testing if an error occurs. It could also be used to determine how much margin has been designed into the valid path by reducing the delay through the valid path.

The time it takes to perform certain operations may vary considerably from the average delay. For these cases it may be worthwhile to have more than one valid signal. The operation that was being performed would determine which valid signal was used. This would make it possible to tune the speed of the macro to the operation being performed.

External Interface

Figure 28:
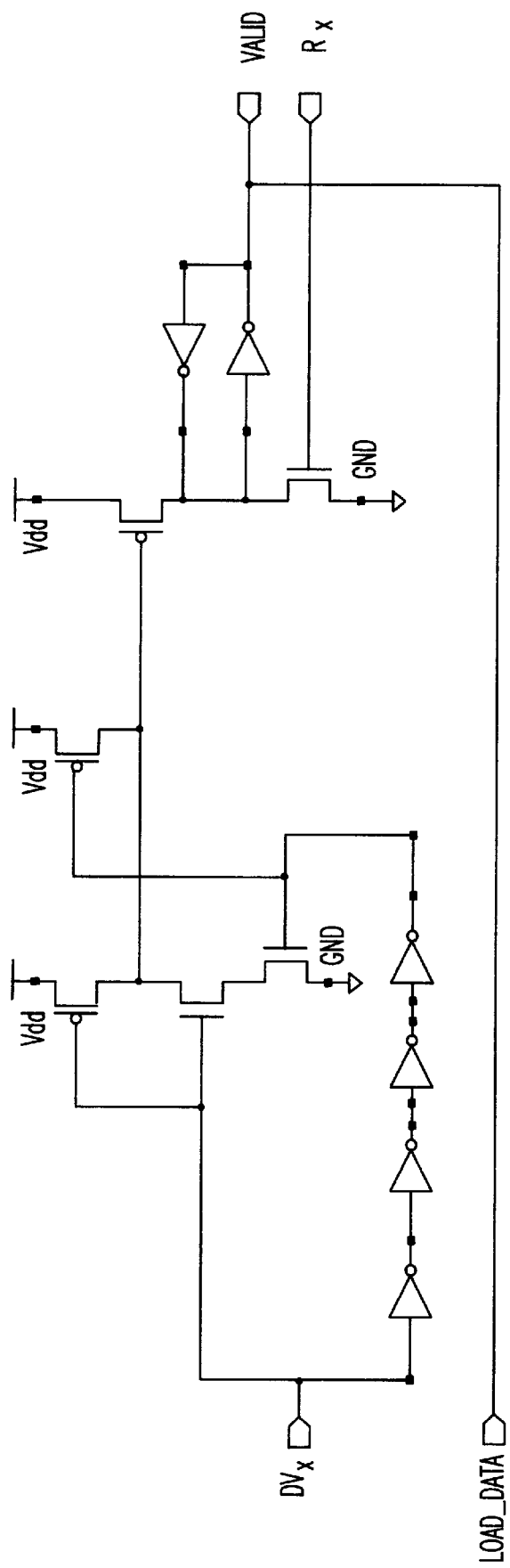
FIG. 28 is a circuit diagram of an external interface circuit.

An interface is needed between the "internal" IPCMOS macros and the "external" world. The handshaking signals that each IPCMOS macro generate make it relatively easy to design this interface. The External Interface shown in FIG. 28 was used in the model of FIG. 3. For this case, the External Interface macro was not the limiting delay of the pipelined stages of the model or to say it another way the external interface was able to supply data fast enough to keep up with the requests from the downstream macro it interfaced. As shown in the circuit diagram of FIG. 28, when the External Interface receives the handshaking signal Rx from the downstream macro indicating that the data from the previous cycle has been received and that it is ready to receive new data, several things happen. First, Rx going high causes the Valid signal to go high indicating data is not in a valid state. Valid and Load_Data are the same signal. Load_Data is used to tell the "external" world that the downstream macro is ready to accept new data. When the "external" world transfers new data, it also sends a handshake signal DVx along with the new data. DVx going high causes the one-shot to fire and Valid and Load_Data to go low. Another cycle will begin when Rx goes high again.

Figure 29A:
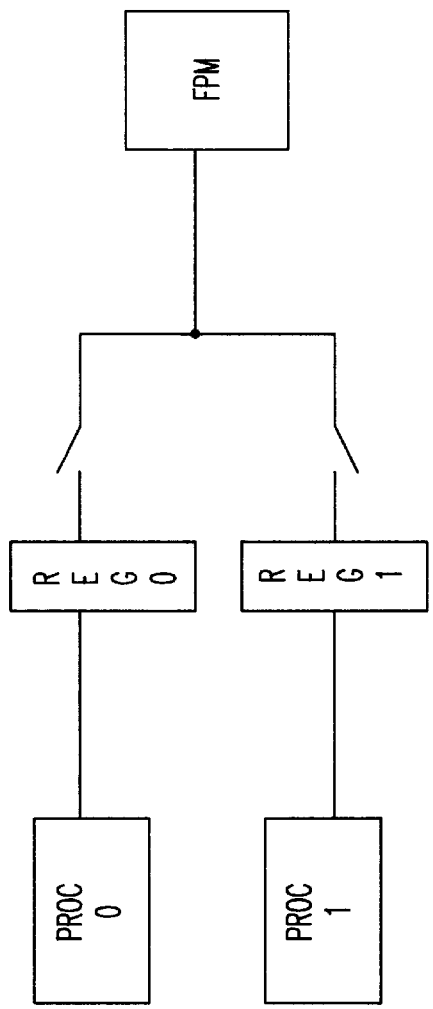
FIG. 29A is a block diagram an asynchronous IPCMOS multiplier macro shared by two synchronous processors.
Figure 29B:
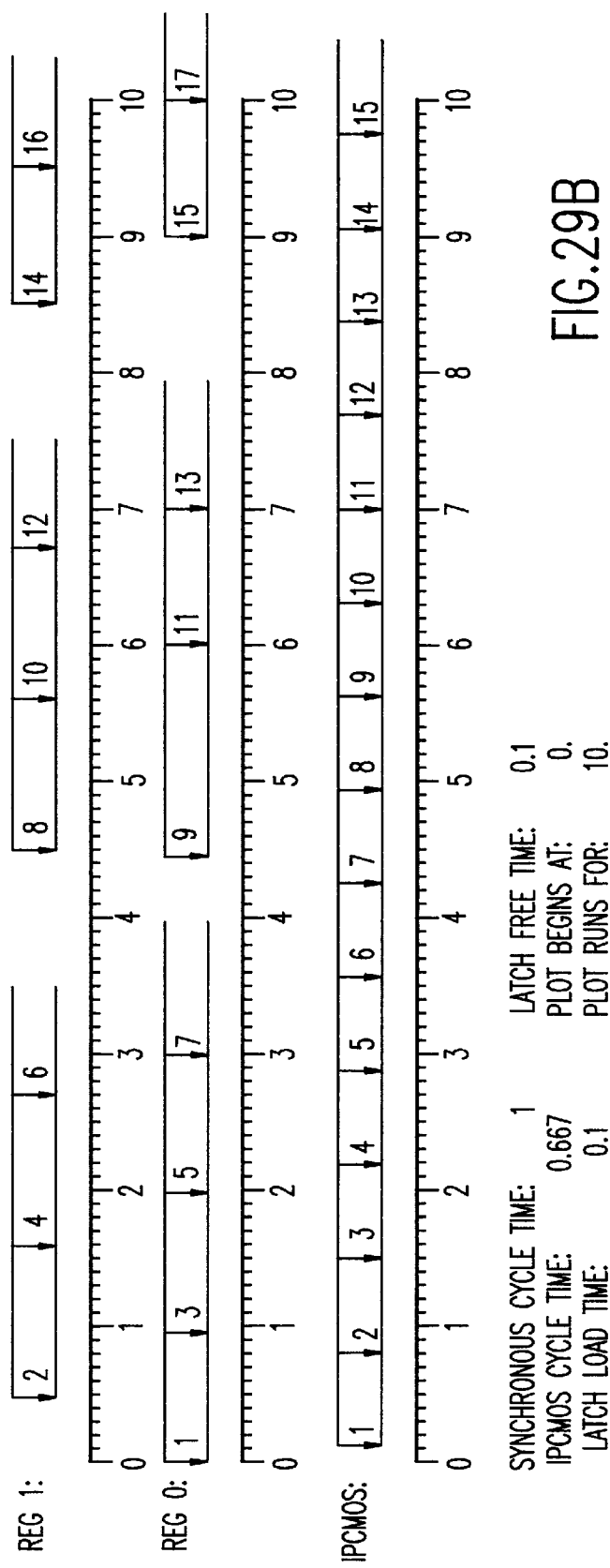
FIG. 29B is a timing diagram of the operation of the circuit of FIG. 29A.

Two conditions can occur if this type of External Interface circuit is used to design a synchronous to asynchronous interface. The first occurs when the speed of the synchronous portion is slower than that of the asynchronous portion. For this case the asynchronous portion will simply slow down as it waits for the upstream macro to send a Valid handshaking signal that indicates there is new data to be processed. In a way, this is similar to what transpired in FIGS. 12 and 13 when the valid signal was intentionally delayed. If the synchronous portion is faster than the asynchronous portion the asynchronous portion will run at its maximum speed but occasionally the synchronous portion will not get a Load Data signal when it is ready to transfer data. It must be able to delay the transfer until the next cycle when this occurs. This is the case in FIG. 29A where an asynchronous IPCMOS multiplier macro is shared by two synchronous processors. Each processor is assumed to be running at a giga Hertz (GHz) for a combined frequency of 2 GHz, whereas the multiplier is running at 1.83 GHz. It is also assumed that each processor wants to issue new data into the multiplier each 1 ns cycle. As shown in FIG. 29B, the multiplier will run without any gaps at 1.83 GHz frequency. However, the two processors will occasionally have to skip a cycle as they wait for the multiplier to catch up. This will occur only infrequently even for this case where the processors are issuing data each cycle. Meta stability can be an issue for the case where the processors are running synchronously at a higher frequency than the asynchronous multiplier. This issue would have to be addressed in any synchronous to asynchronous interface.

Clock

Figure 30:
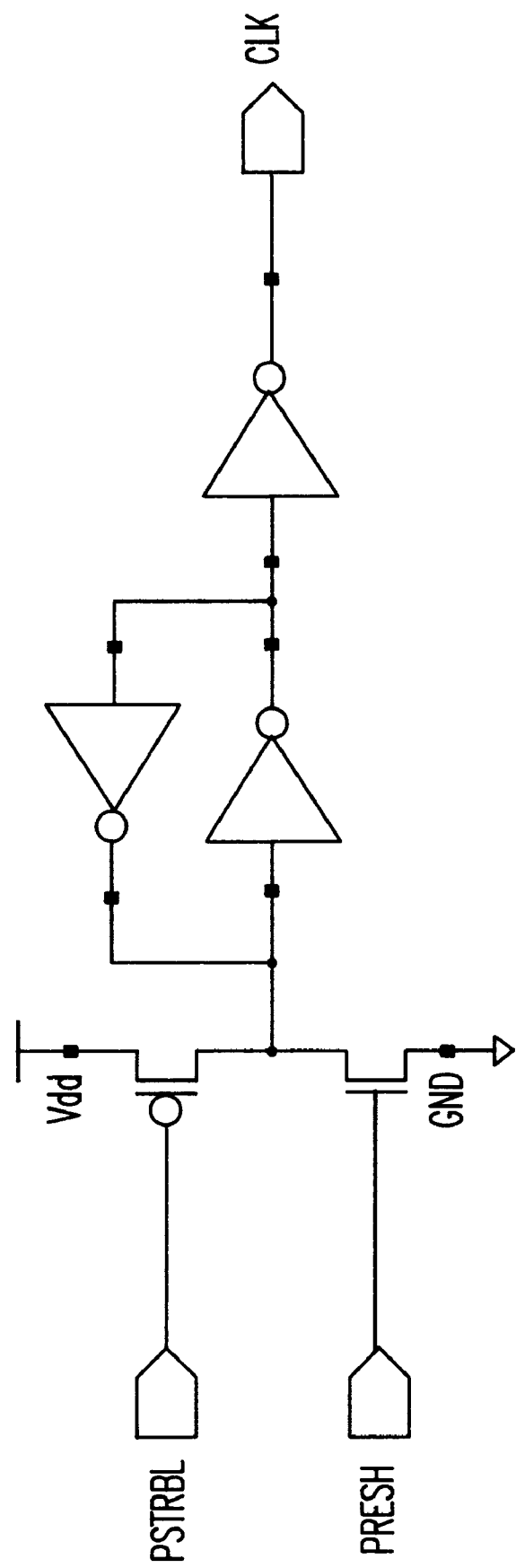
FIG. 30 is a circuit diagram of the clock for the domino logic.

In IPCMOS, the timing is generated at the local macro level without the need of a global clock. However each domino stage in the simulations that have been presented used a locally generated clock for precharging and evaluation of the domino stage. This local clock is generated from the local strobe and reset signals as shown in FIG. 30. Since the timing of this local clock is derived from the interlocked handshaking signals for the local macro, it will be automatically timed and synchronized to these signals. The clock will also automatically track variations in chip delay caused by process parameter variations. As shown in the circuit diagram of FIG. 30, the clock will transition high as a result of PSTRBL going low and will transition low when PRESH goes high. In addition to eliminating the global clock distribution issues and causing a significant reduction in delta I noise as a result of spreading out the clock transitions, the clock is extremely simple and easy to design.

Standard Interface

Figure 31:
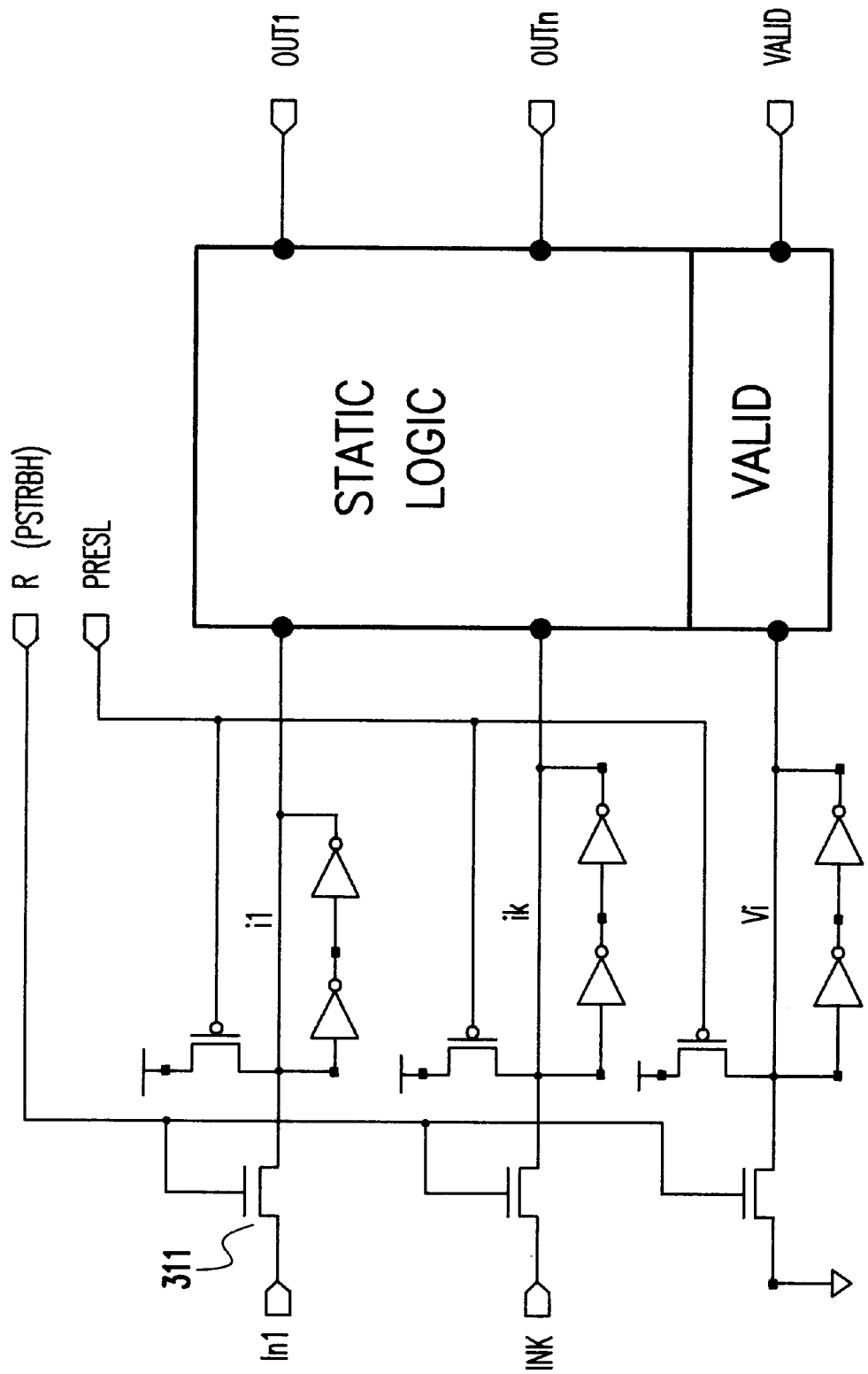
FIG. 31 is a block and circuit diagram of a first macro interface.
Figure 32:
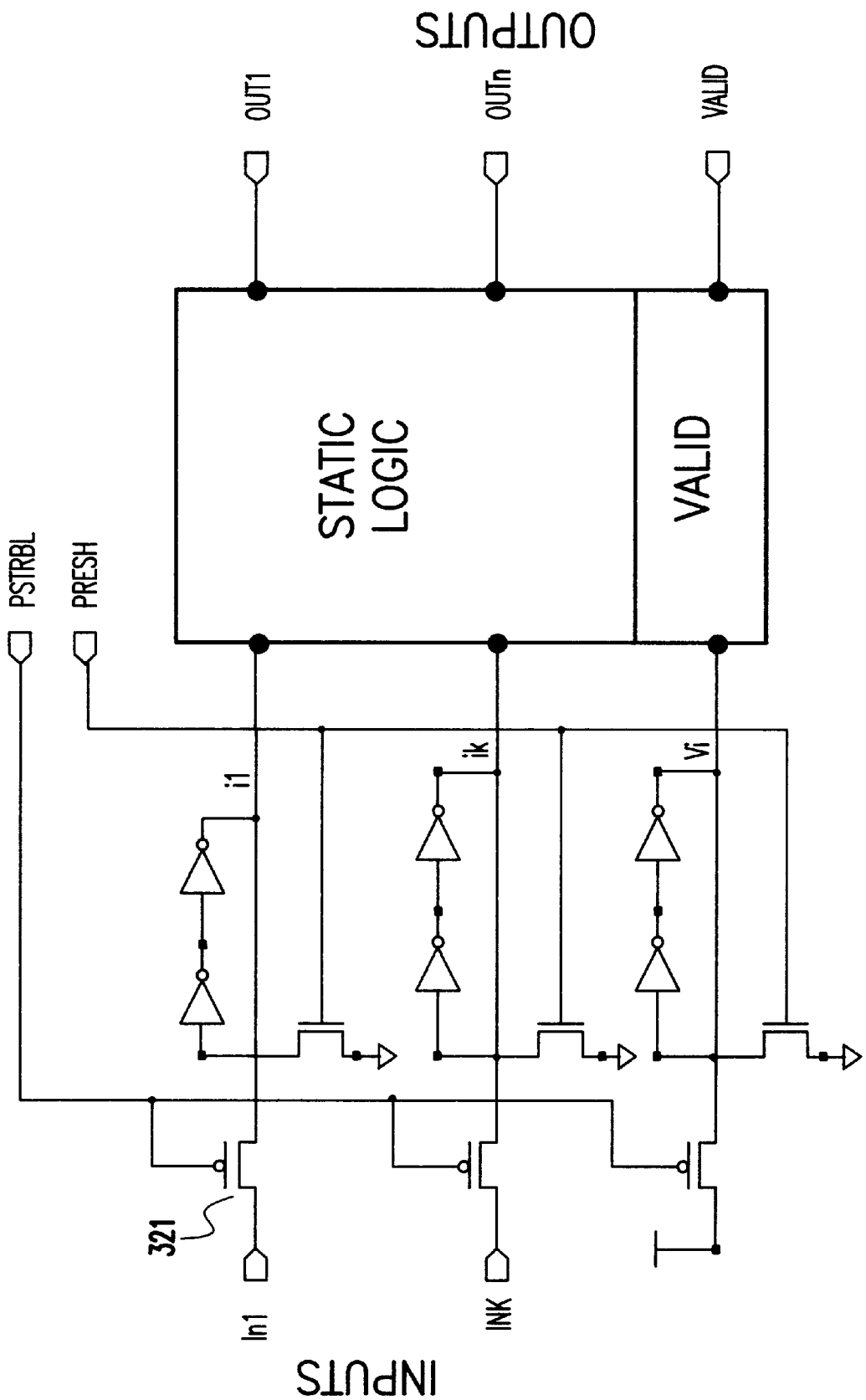
FIG. 32 is a block and circuit diagram of a second macro interface.
Figure 33:
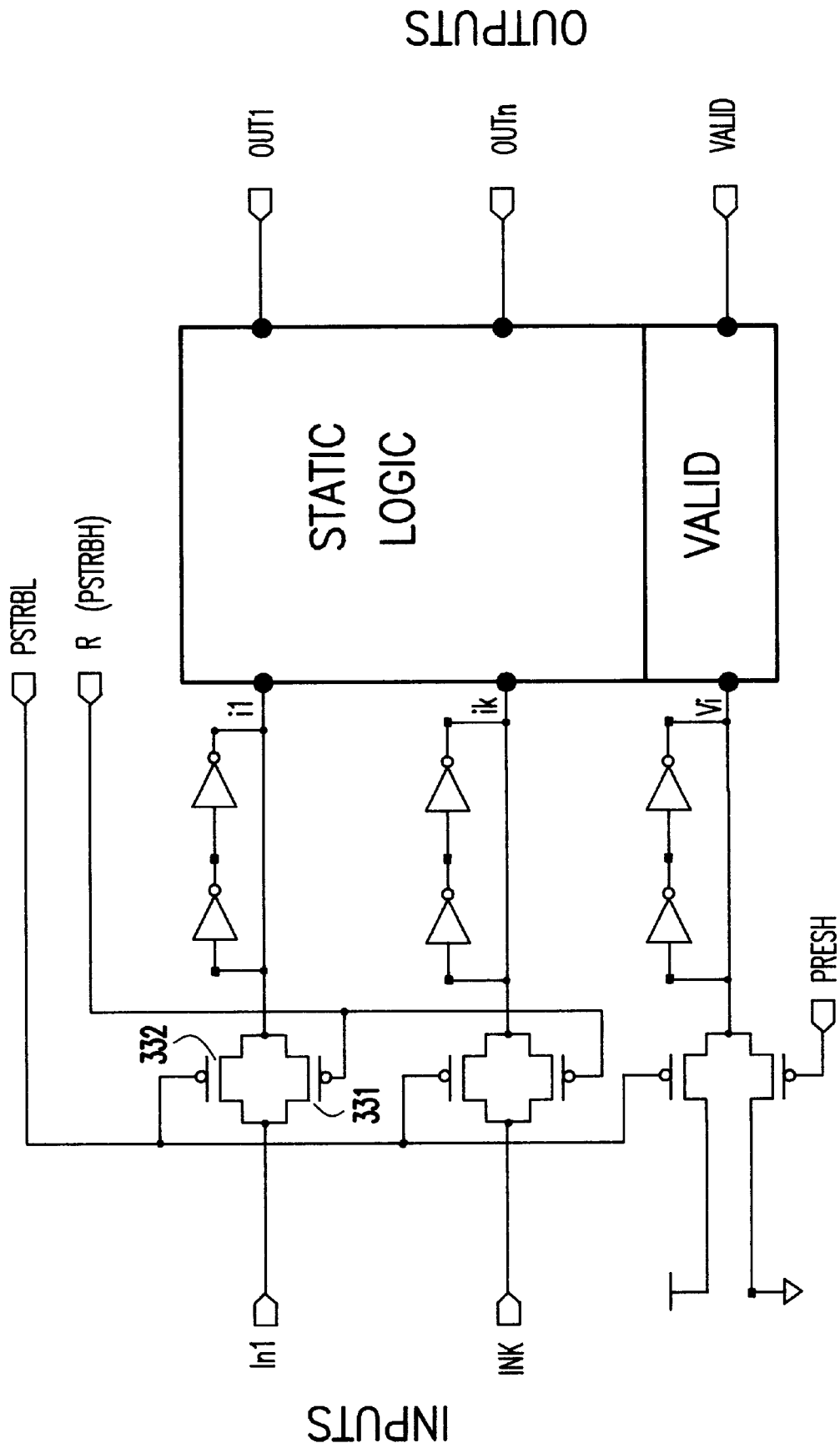
FIG. 33 is a block and circuit diagram of a third macro interface.
Figure 34:
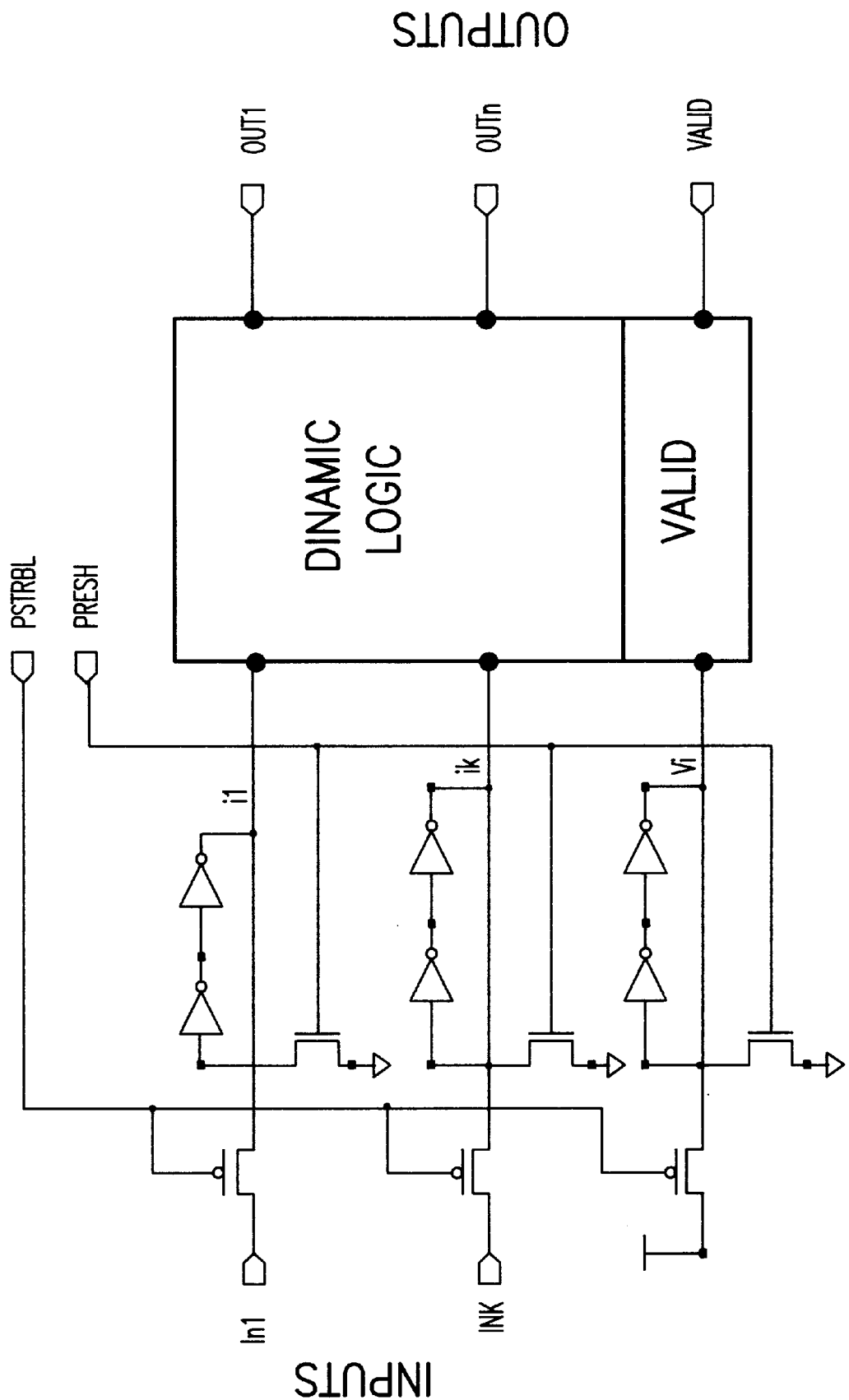
FIG. 34 is a block and circuit diagram of a fourth macro interface.

A key feature of IPCMOS is that the data at the input to a macro is sampled by the strobe pulse. This is accomplished by means of a switch or pass gate which is placed in series with every input. When the data is valid, strobe will turn on the pass gates or close the switch allowing the input data to be sampled and captured. Strobe will then turn off and the pass gates or switches will open. At the end of the cycle when reset transitions, the internal inputs can be reset high or low or can retain the same value. The ability to sample the data only after it has reached a valid state makes it possible to use the same interface for a variety of macro types (static, dynamic, etc.) and makes the concept of reusable macros possible. In addition, as has been previously discussed, all the timing needed to sample the data is generated from the local macro handshaking signals. Examples of this standard macro interface are shown in FIGS. 31 to 34 for static and dynamic logic. For static logic, several cases are considered. The first is for the case where the internal input is reset high at the end of the cycle, as shown in FIG. 31. For this case, an n-channel pass gate 311 with its gate connected to PSTRBH can be used to sample the external data since the internal nodes i1–ik will either remain high or discharge low when the switch is closed. The next case shown in FIG. 32 is where the internal inputs are reset low at the end of the cycle. For this case, a p-channel pass gate 321 with it gate driven by PSTRBL is used since the internal nodes i1–ik will either remain low or charge high through the p-channel switch. For the next case shown in FIG. 33, there is no reset so the internal nodes i1–ik can either be high or low at the end of a cycle. As shown in FIG. 33, this case requires both n and p pass gates 331 and 332, respectively, since the internal nodes i1–ik can be either charging or discharging during the sampling period. The last case considered, shown in FIG. 34, is for a dynamic logic macro where it is assumed the internal nodes i1–ik are all precharged low at the end of the cycle (see FIGS. 4 and 8). This case is identical to the static logic case where the internal inputs were precharged low by the reset.

In all of these cases, the switch is only closed for a brief period of time when the valid data is sampled. The rest of the cycle the switch is open and the internal data inputs are not connected to the external data inputs. Thus, the switch makes it possible to both precharge the internal data inputs independent of the state of the external inputs and to sample the external data input only after it has reached a valid level. With this type of interface, different logic families such as static and dynamic can be interconnected and the concept of reusable macros becomes a reality.

Testing

With the dramatic increase in chip complexity and operating frequencies, testing continues to be a major concern. In IPCMOS, where there is a standard interface consisting of a switch between external data inputs (or outputs from the upstream macro) and the internal macro inputs and also where the timing is generated by the local macros, it appears to be relatively straight forward to do both direct current (dc) stuck fault testing and alternating current (ac) performance testing with a minimal of overhead. As operating frequencies reach a GHz and beyond, it is becoming more and more difficult to supply clocks needed for ac testing. Generating the timing and clocks locally may be a real advantage for IPCMOS, since the same timing signals needed for normal operation can be used during dc and ac test. Also since the scan chain and test circuits do not need to run at high speeds or supply high frequency clocks, their design is greatly simplified. In order to understand the proposed methodology for testing IPCMOS, it is helpful to first show how dc stuck fault testing is done followed by a discussion of ac testing.

Figure 35:
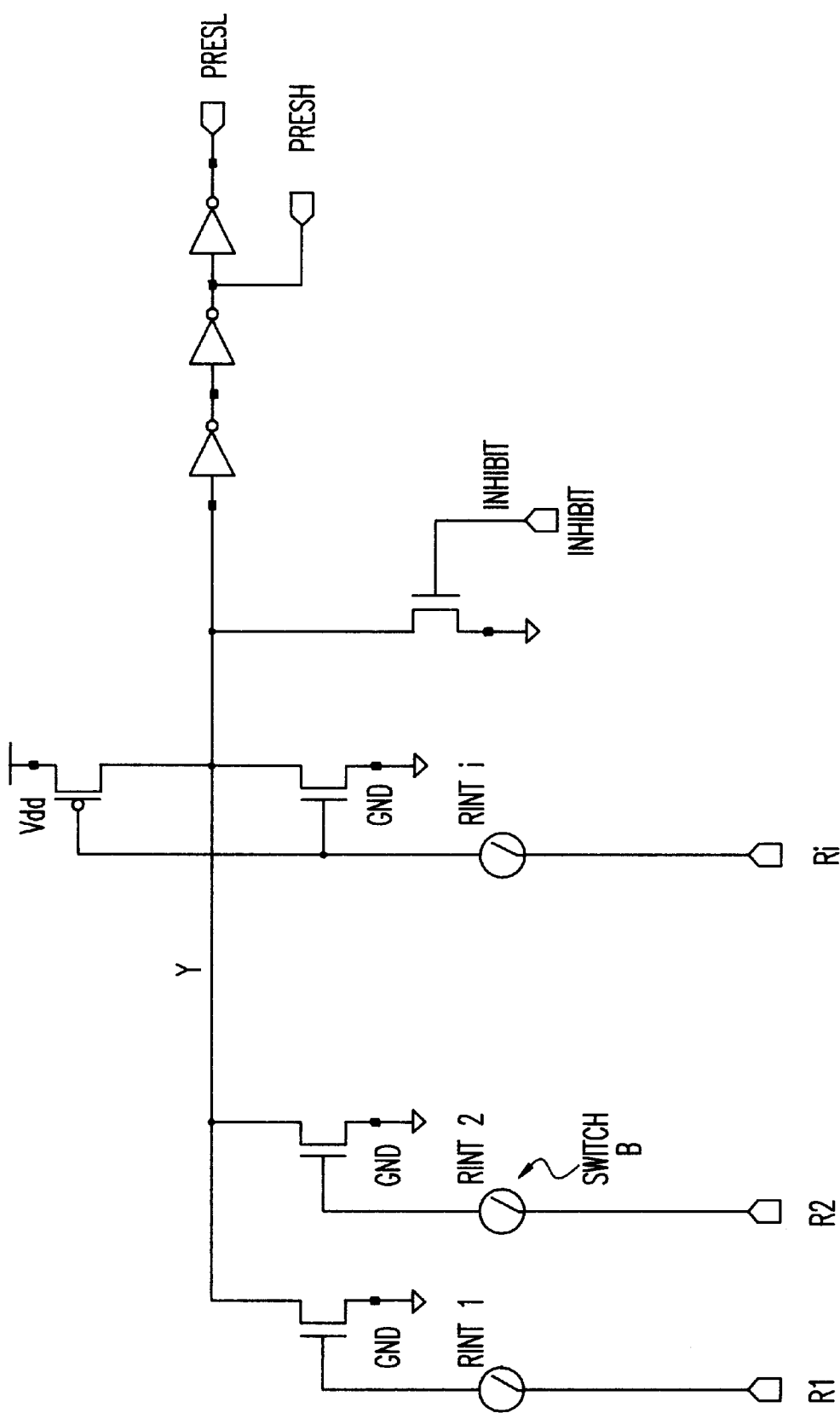
FIG. 35 is a circuit diagram of a reset inhibit test circuit.
Figure 36:
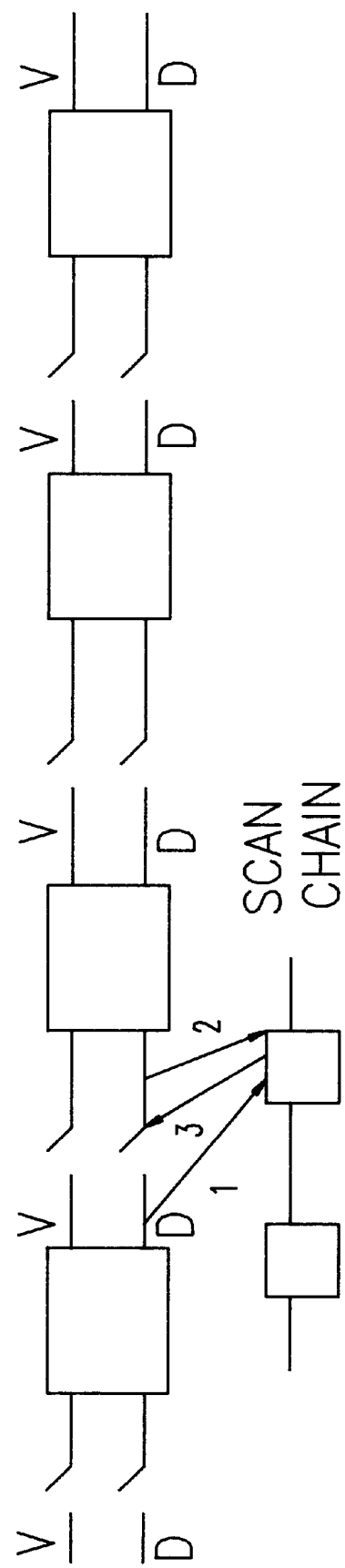
FIG. 36 is a block diagram showing the inhibit input to the Reset Circuit high so that node Y is clamped low preventing the outputs from transitioning.

In order to do dc stuck fault testing on a macro, one needs access both to its inputs and its outputs. With the interface that is used in IPCMOS, if the switches are forced to stay in the open position and a means is provided to input test patterns to the macro and capture the resulting outputs, dc stuck fault testing can be done. Forcing the switches between the external inputs (outputs from the upstream macro) and the internal inputs to stay open can be accomplished by inhibiting the Reset Circuit as shown in FIG. 35. Normally, the Inhibit input is low and the Reset Circuit will function as described earlier. If the Inhibit input to the Reset Circuit is high, node Y will be clamped low and the outputs will not transition. In this mode, as shown in FIG. 36, if data is launched into a chain of macros with Reset inhibited, each macro will perform its function and pass its resulting output to the next macro in the chain. Since there is no reset, the switches between macros after the first cycle will not close, thus preventing another cycle from starting. The data in each macro will be captured in the small latches on each input (see FIGS. 31 to 34), and the output will have the state determined by these inputs. It should be noted that all the timing during this first cycle as data propagated through the chain of macros was at normal operating speed. The addition of the scan chain as indicated in FIG. 36 offers the following test options:

1. Data can be loaded from the macro outputs to the scan latches and scanned out to verify if correct. 2. Data can be loaded from the other side of the switch to the scan latches to verify that the output data (external input) and internal input data are the same indicating the strobe timing is correct. 3. Data can be loaded from the scan chain to the internal inputs and then scanned out from the macro output as described in (1) to do dc stuck fault testing.

Thus, with the reset inhibited as described above, when data is launched it will propagate from macro to macro for one cycle at speed. Since the switches stay open after the first cycle, the data for each macro is then held in the latches on the macro inputs. At this point if the data at the inputs to any macro is changed, it will only propagate to the macro output since the switch to the next stage is open. At this point as described, conventional dc testing can be done.

Figure 37:
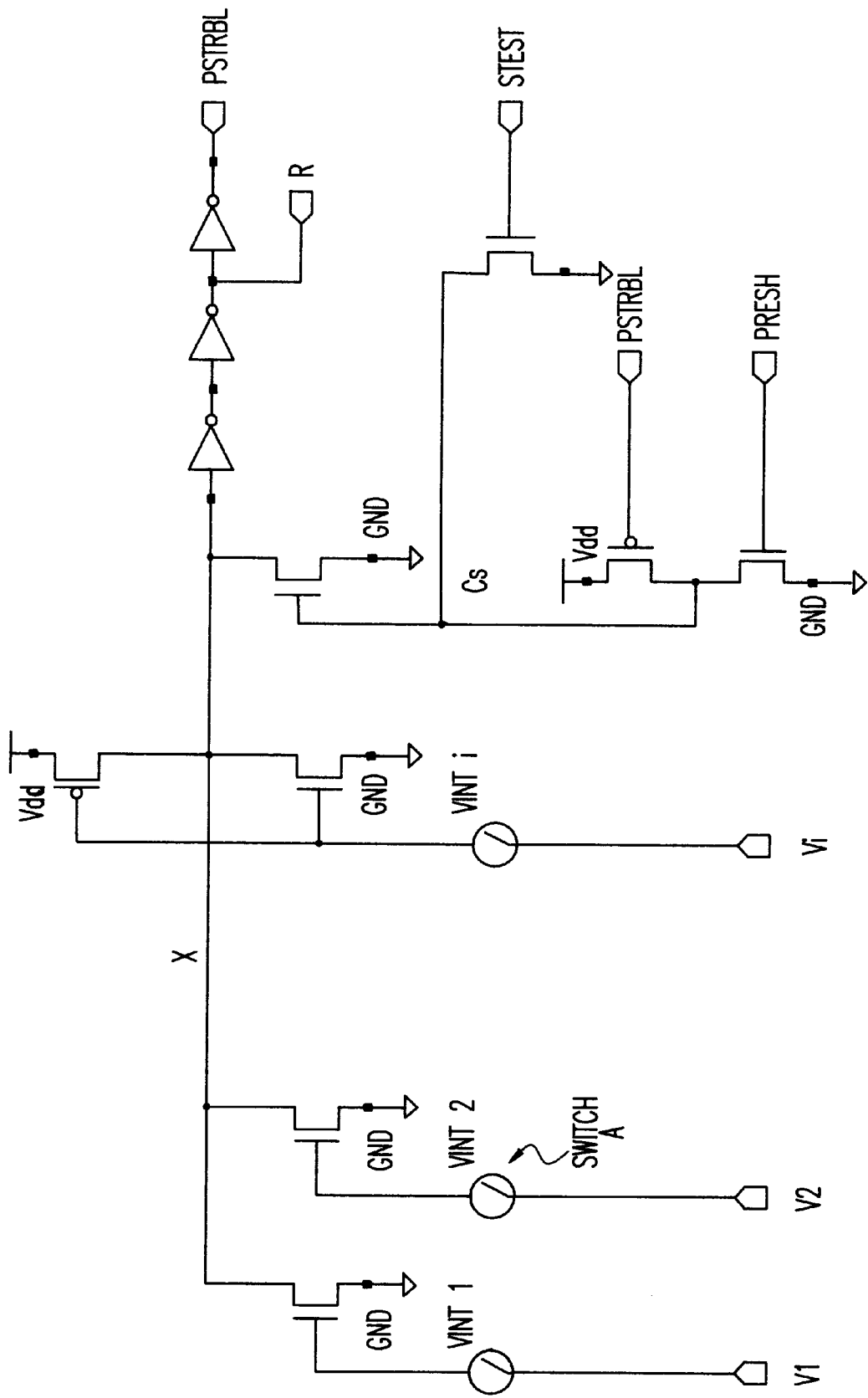
FIG. 37 is a circuit diagram of a strobe test circuit.
Figure 38:
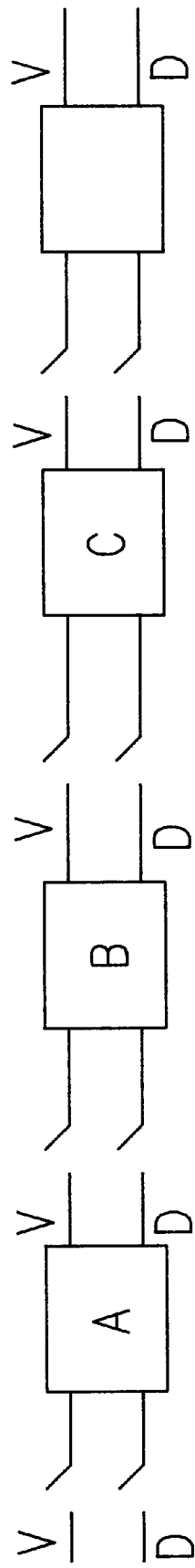
FIG. 38 is a block diagram with the sequences used to do pattern testing at speed.

Further ac testing is possible by over riding the inhibited reset on the strobe circuit. This can be seen in the Strobe Test Mode circuit of FIG. 37 where the STest path has been added to the Strobe Circuit that was described earlier. By inhibiting reset (as in FIG. 35), node Cs of FIG. 37 will be charged high when PSTRBL transitions and will remain high since Reset has been inhibited and PRESH remains low. However, the STest test input signal makes it possible to override the Reset inhibit by discharging node Cs when it goes high. This is the same function that PRESH performs. How this is used to do pattern testing at speed is given in the sequences shown in FIG. 38. The first couple of steps where Reset is inhibited, data launched, the switches open, and data loaded at the macro A, input for a desired pattern at the macro A output are identical to what was described above for dc testing. Next STest is brought high for macros B and C. This causes the Cs node of the Strobe Circuit for these two macros to be reset so this path no longer prevents the strobe circuit from firing when its valid internal inputs have all transition low. The valid A input is now switched so a Valid signal appears on the output of macro A. The Strobe circuit of Macro B will generate a strobe sampling the output data of macro A and switching the state of the B input valid signal. This will in turn cause the same sequence events to transpire for macro C. On the initial cycle when data is launched, the macros operate at speed for one cycle. The same is true for subsequent cycles where STest is used so the strobe can go through an additional cycle of operation. This will take place at normal operating speeds with no external high speed signals required. This same sequence can be repeated with different input patterns until the macro(s) is adequately tested.

Generating the timing locally has the distinct advantage that the same timing can be used to test the chip at speed. Normally, to do ac testing high speed clocks must be provided by the scan chain test circuitry. At GHz frequencies and beyond this is exceeding difficult or impossible. Obviously, the design of the scan chain is much simpler if it only has to run at low frequencies and does not have to supply high speed precise testing signals.

Interface Simplification

Some changes to IPCMOS result in significant simplification and enhanced performance. The basic interlocked handshaking and the various circuit macros that have been described do not change. The change is really in how the data is strobed or captured or how the standard interface to each macro is implemented.

Figure 8:
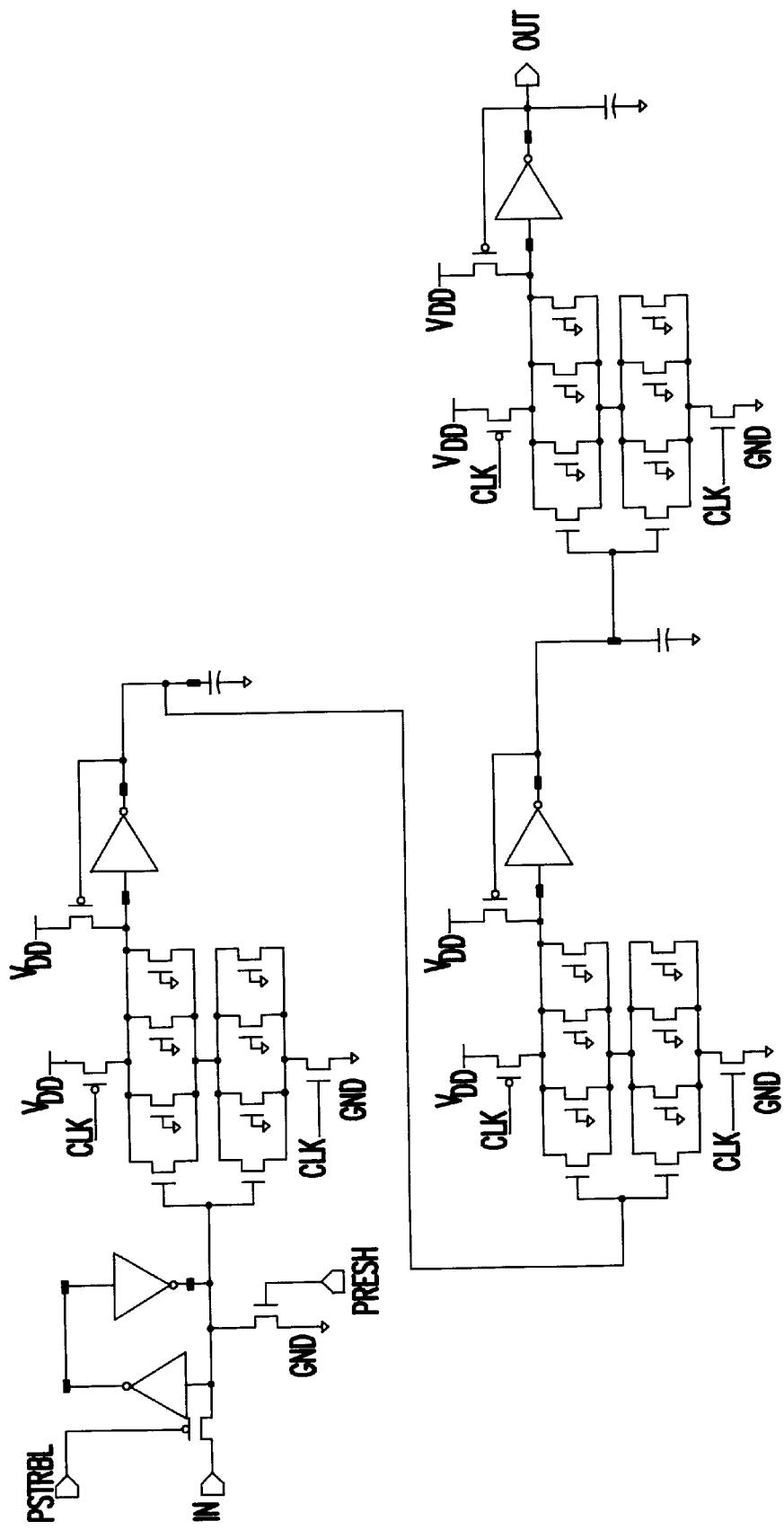
FIG. 8 is a circuit diagram showing a three stage domino logic block.

In the dynamic domino circuits of FIGS. 4 and 8, a "switch" was added in series with each data input. The switch, which is controlled by the strobe only, closes when the input data is valid. When the switch closes the data on each of the inputs passes through the switch to the internal gates of the domino stage. This can also seen in standard interface for dynamic circuit macros shown in FIG. 34. The small latch on the internal node of the switch is used to hold the state of the data when the strobe pulse goes high and the switch opens. Once the data is captured on the internal nodes of the domino stage the clock can transition high causing the domino stage to go from the precharge to evaluate mode. Even if the clock should transition before the data is valid no error will occur since at the end of the cycle the internal nodes of each of the domino stage are precharged high causing the outputs to go low. The low on the output which becomes the input to the next stage will not cause n-channel tree of the domino stage it is driving to discharge.

The clock for the dynamic domino stage is connected to both the p-channel precharge device and the n-channel evaluate device. When the clock is high, the domino stage is in an evaluate mode, and when the clock transitions low the circuit is precharged. The internal node of the domino stage, which is precharged high and then conditionally discharged depending on the values of its inputs, is connected to the output through an inverter as shown in FIGS. 4 and 8. Also there is a small p-channel half latch device between the power supply and the internal node with its gate connected to the output node. This device prevents the high state of the internal node from discharging due to leakage or charge redistribution during the evaluate phase when the inputs to the n-channel tree do not provide a path to ground.

Thus, the only difference between the domino stage used in IPCMOS and the domino stage used in a conventional approach are the switches on each of the inputs of the IPCMOS case. Of course, in the IPCMOS case the clocks for each stage are generated locally from the interlocked handshaking signals.

Figure 39:
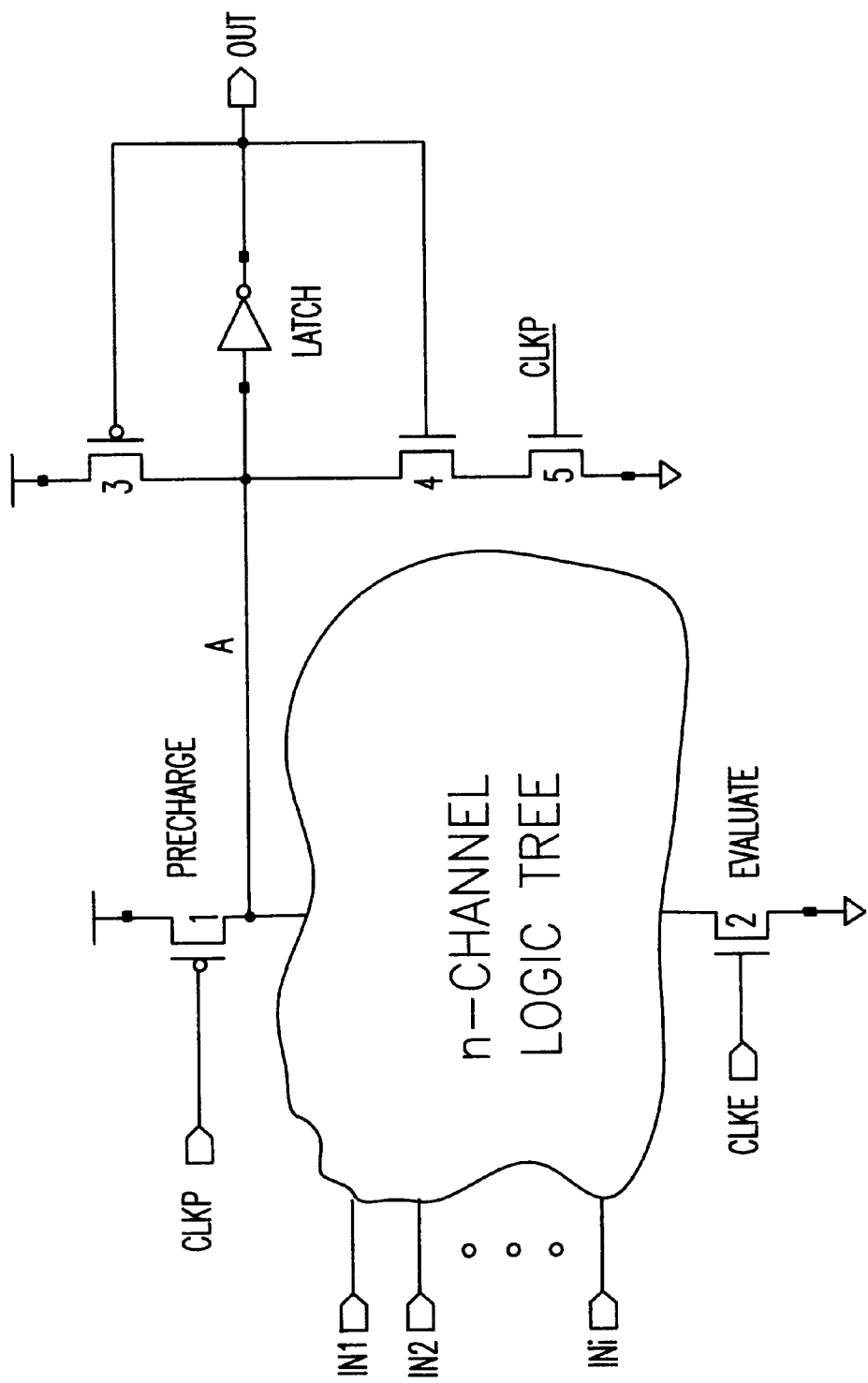
FIG. 39 is a circuit diagram showing the addition of two small devices to the domino stage and the provision of separate clocks for evaluate and for precharge.

With a few minor modifications to the IPCMOS domino stage, its performance can be improved even more compared to a conventional domino stage while at the same time its complexity can be simplified. The first step in this process was understanding that only when the clock transition high did data have to be valid. This means that the switches on all the inputs can be removed since the clock for each stage only transitions to the high evaluate state when the data is valid as a result of the interlocking. Eliminating the switches on each input greatly simplifies the domino stage. The next thing that is done is to add two small devices to the domino stage and to provide separate clocks for evaluate and for precharge as shown in FIG. 39. The combination of separate clocks (CLKE and CLKP) and the two small devices (4 and 5) converts the output of the domino stage into a latch where data is both launched and stored. During the time the precharge clock (CLKP) is low and the stage is being precharged the internal node A will be connected to the power supply through device 1. After the precharge clock (CLKP) goes high and before the evaluate clock transitions high or when the evaluate clock transitions high if there is no path between the internal node A and ground, the internal node will be held high by the small p-channel device 3 whose gate is connected to the output node (Out). This small p-channel devices overcomes any potential drop in voltage at the internal node due to leakage or charge redistribution. This is also the case when both the precharge and evaluate clocks are in their inactive states and the internal node A is high. For the case where the internal node A has discharged low during the evaluate portion of the cycle it will be held low during the inactive portion of the cycle when the evaluate clock transitions low by the two small n-channel transistors 4 and 5. The gate of transistor 4 is connected to the output node Out which is high and the gate of transistor 5 is connected to CLKP which is also high. The purpose of n-channel device 5 is to open the path from the internal node A to ground at the start of the precharge portion of the cycle, thus making it easier to precharge the internal node A of the domino stage. As shown in FIG. 39, the combination of these devices with the inverter stage forms a latch that becomes active whenever the precharge clock (CLKP) is high or inactive. The logic for the domino stage that is shown in FIG. 39 was extracted from a worst case path through the compressor tree of a floating point multiplier. Performance numbers will be given after a section on a static implementation of the same floating point multiplier.

Figure 40:
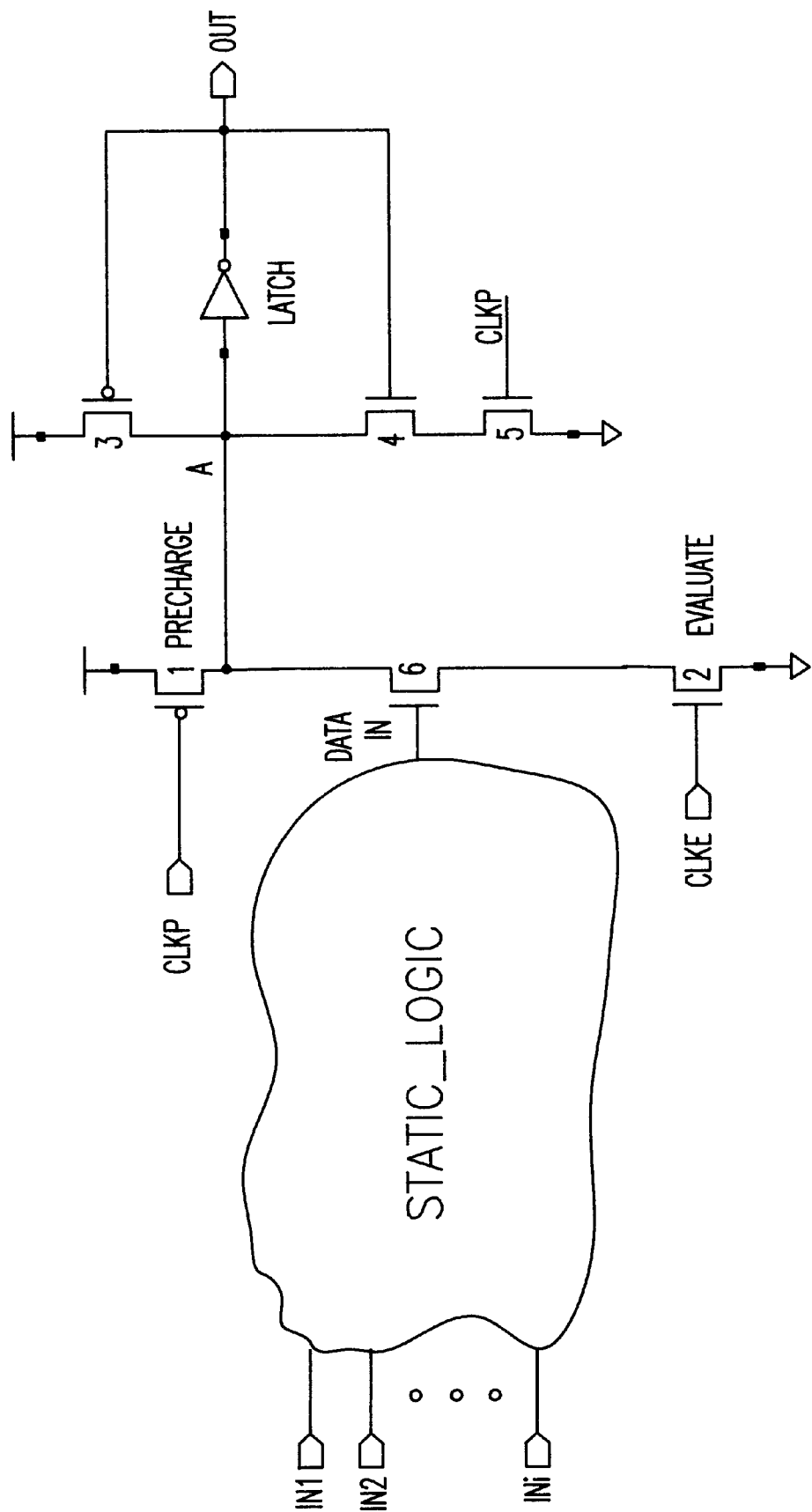
FIG. 40 is a circuit diagram of a latch modified for a static logic implementation.
Figure 41:
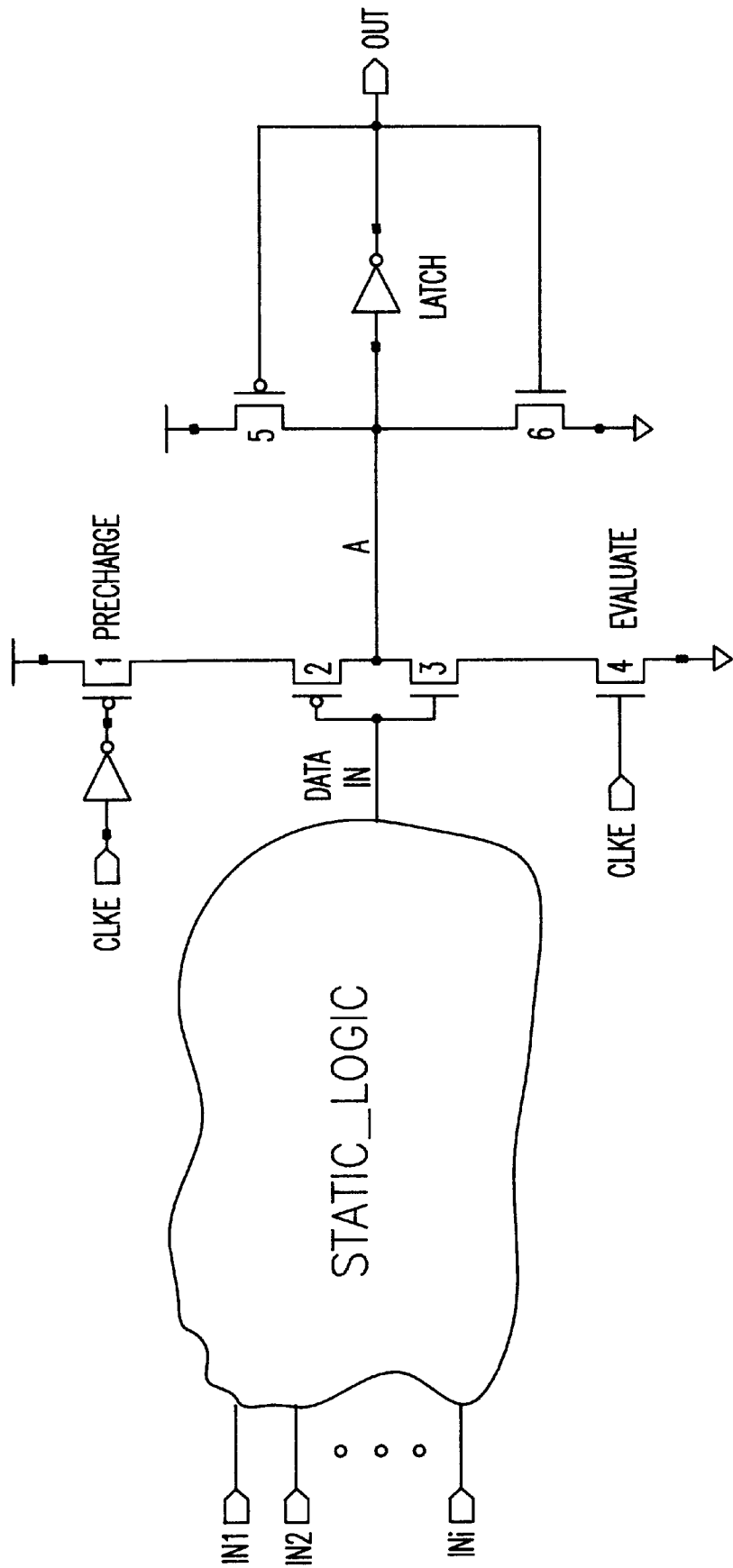
FIG. 41 is a circuit diagram showing modifications of the latch which result in the elimination of the precharge clock.

A key advantage for IPCMOS is the ability to provide a standard interface so that dynamic and static logic macros or a combination of different macro types can be interconnected. In order to maintain this objective the same latch described above for the dynamic version could be easily modified for a static logic implementation as shown in FIG. 40. In this implementation, the evaluate and precharge clocking is the same as was used in the dynamic version. The static logic interfaces the latch through n-channel transistor 6 as shown. In a sense the logic tree that was described in the dynamic version has been reduced to a single transistor with the static logic output as its input. For this particular static logic implementation the latch is precharged every cycle whether or not the input data has changed. Having the high precharge level propagate through the logic every cycle will result in higher power dissipation. This can be avoided by some further modifications of the latch shown in FIG. 41 which result in the elimination of the precharge clock so that the latch data changes only when the input data changes from one cycle to the next. Eliminating the precharge portion of the cycle should also result in higher performance.

Figure 42:
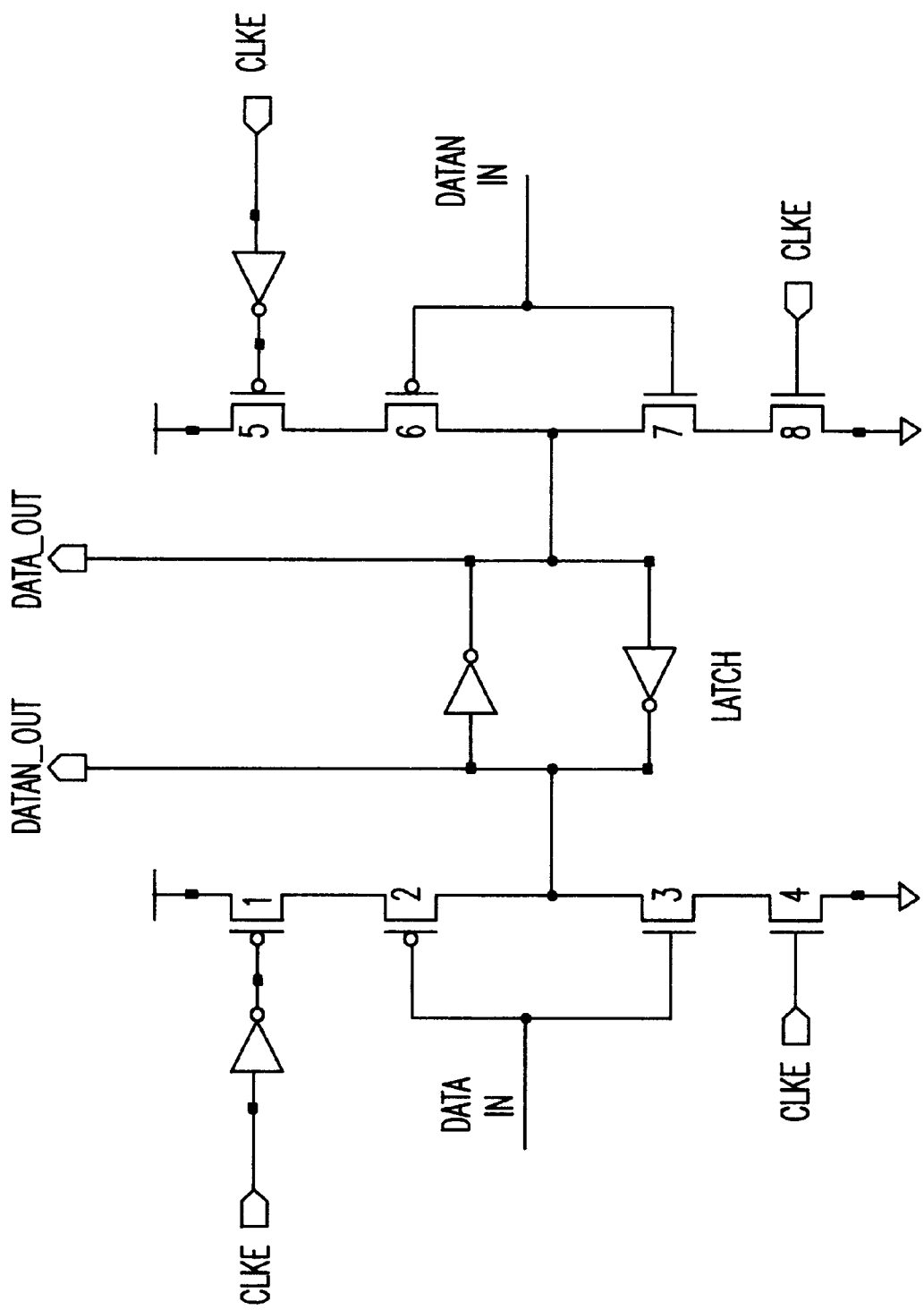
FIG. 42 is a circuit diagram showing one possibility for implementing a dual rail input latch.
Figure 43:
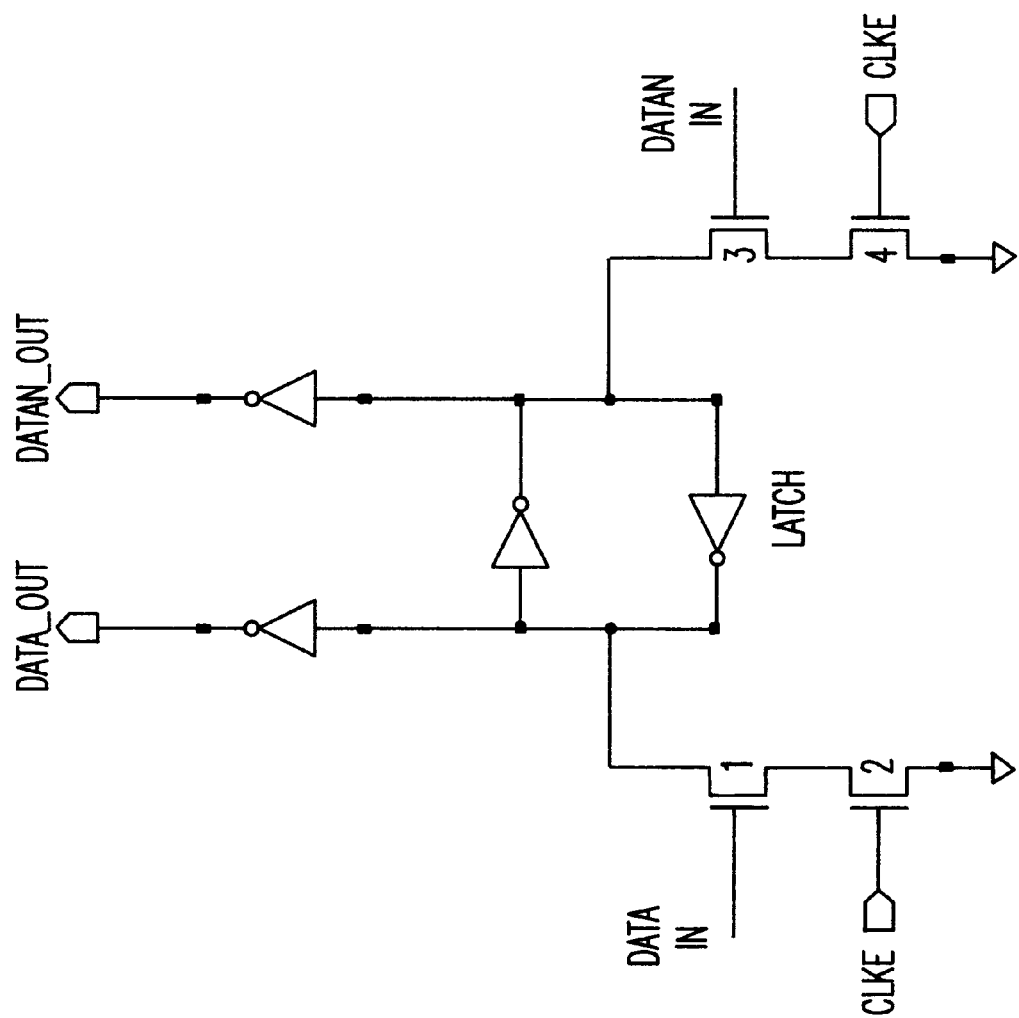
FIG. 43 is a circuit diagram showing another way to implement the dual rail input latch and the one that was chosen for the simulation model that was built.

Another static logic version that was looked at used dual rail inputs to achieve higher speed. Since this version was actually being considered for the floating point multiplier in a potential product it was decided to modify it for IPCMOS and use it in our simulations. One possibility for implementing a dual rail input latch is to combine two of the latches of FIG. 41 as shown in FIG. 42. Another way to implement the dual rail input latch and the one that was chosen for the simulation model that was built is shown in FIG. 43. The evaluate clock (CLKE) for each stage of the floating point multiplier is generated from the interlocked handshaking signals. Data is stored in the cross coupled latch of FIG. 43 and only changes state if the inputs change. This latch and the evaluate clock necessary to drive it were simulated in the model of FIG. 3.

The performance for a worst case path through the compressor tree of a 56-bit floating point multiplier designed with static dual rail circuits and the latch of FIG. 43 are given in Table A. Simulations were done for a 200 nm technology and then, based on the National Technology Roadmap for Semiconductors, scalings to 180 nm and 150 nm were made.

TABLE A

Static IPCMOS FPM Results

| Technology | Frequency | | | Latency/Stage | | |
|---|---|---|---|---|---|---|
| | 200 nm | 180 nm | 150 nm | 200 nm | 180 nm | 150 nm |
| 1 stage | — | — | — | — | — | — |
| 2 stage | 1.45 GHz | 1.77 GHz | 2.01 GHz | 210 ps | 172 ps | 151 ps |

In Table B, the performance is shown for the worst case path of the dynamic domino circuit and latch shown in FIG. 39.

TABLE B

Dynamic IPCMOS FPM Results

| Technology | Frequency | | | Latency/Stage | | |
|---|---|---|---|---|---|---|
| | 200 nm | 180 nm | 150 nm | 200 nm | 180 nm | 150 nm |
| 1 stage | 2 GHz | 2.44 GHz | 2.78 GHz | 260 ps | 213 ps | 187 ps |
| 2 stage | 1.85 GHz | 2.26 GHz | 2.57 GHz | 150 ps | 123 ps | 108 ps |

The number of stages (for the cases considered here 1 or 2) is defined as the number of logic stages between latches. This can be seen by referring back to FIGS. 4 and 8 and with the recognition that the latches have been moved from the input of the stage to the output. For both the static and dynamic versions extremely high frequencies and small latencies per stage are achieved. The dynamic domino implementation is about 28% faster than the static implementation. The precharge portion of the cycle that is needed in the dynamic implementation occurs during the time needed for the reverse handshaking.

Figure 44:
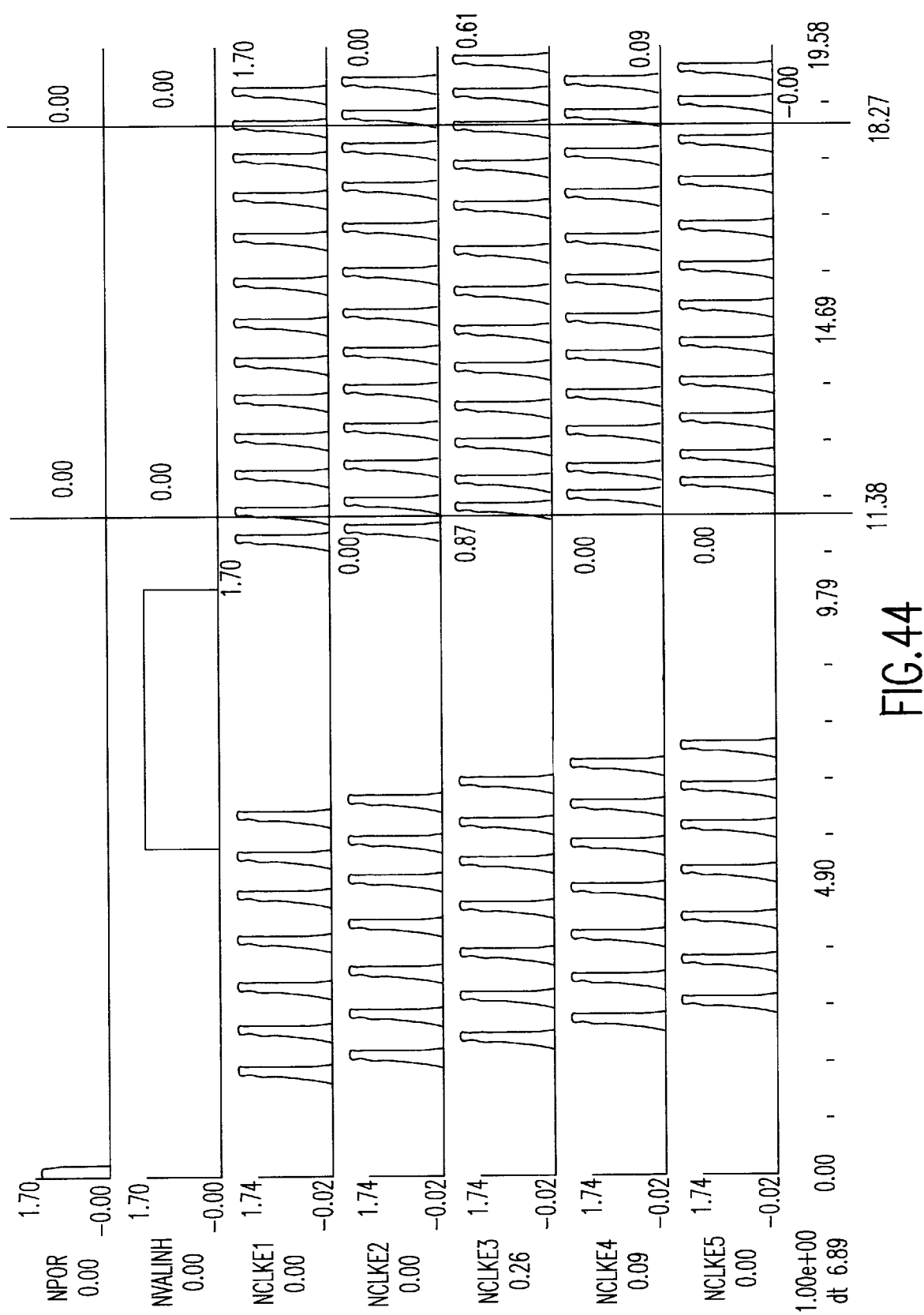
FIG. 44 is a graph showing waveforms which demonstrate the robustness of the interlocking of the IPCMOS approach.

A key feature of IPCMOS is that the signals and clocks needed for this extremely high speed operation are generated locally from the interlocked hand shaking. The robustness of the interlocking is seen in the waveforms of FIG. 44 where a large delay was intentionally introduced into the handshaking path. Since the timing is derived from the interlocked handshaking circuits and not from a global clock even with the introduction of this exaggerated delay the circuits automatically adjust with no loss of data. This would be very difficult or impossible to do in a conventional synchronous system.

At speeds in excess of 1–2 GHz Ldi/dt noise will become even a more serious problem than it is at lower frequencies. The way IPCMOS operates should result in significant Ldi/dt noise reduction. As shown in FIG. 44, the locally generated clocks in IPCMOS are staggered from stage to stage. This will dramatically reduce the current changing at any time. In addition the gradual way stages power off and on, also seen in FIG. 44, should further reduce L di/dt noise during the time functions are powered off or on.

IPCMOS is a form of logic that results in extremely high performance pipelined operation. The interlocking guarantees error free operation where variations in timing are compensated for automatically by the circuits. A standard interface makes it possible to interface different macro types easily. This can be done because input data is sampled only when it has reached a valid state and the internal input to a macro is separated from the external input by a switch. The overall design should be simpler since the critical timing issues are confined to the local macro. Global timing issues are dealt with by the interlocked circuits. As a result of the timing being generated locally and being pipelined there should be significant power supply noise reduction. The advantages of IPCMOS will continue to increase as chip operating frequencies move into the GHz range, the area of the chip grows, and the number of transistors on a chip continues to increase.

While the invention has been described in terms of preferred embodiments and examples, those skilled in the art will recognize that the invention can be practiced with modification within the spirit and scope of the appended claims.

Having thus described our invention, what we claim as new and desire to secure by Letters Patent is as follows:

1. Interlocked pipelined logic macros comprising:
    a data input path and an output path;
    a valid path and a reset path, the valid and reset paths providing interlocked timing in both forward and reverse directions of data flow between the input and output paths and that guarantee correct data output cycle sequencing;
    a strobe circuit receiving valid signals and generating strobe and reset signals;
    a valid circuit which generates a valid signal that tracks a timing for the logic of the macro; and
    a reset circuit which performs a handshaking function on reset signals coming from downstream macros.

2. The interlocked pipelined logic macros recited in claim 1, wherein the strobe circuit comprises:
    inputs which receive valid signals from upstream macros and reset signals from downstream macros;
    an AND function which performs a unique AND on the inputs; and
    means for keeping track of a cycle in which the signals occur.

3. The interlocked pipelined logic macros recited in claim 1, wherein the reset circuit comprises:
    means for performing a handshaking function on the reset signals coming from downstream macros;
    an AND function which performs a unique AND on the reset signal inputs; and
    means for keeping track of a cycle in which a reset overlapping and non-overlapping pulses occur.

4. The interlocked pipelined logic macros recited in claim 1, wherein the valid circuit generates a timing signal each cycle indicating that data is valid, wherein the timing signal has adjustable timing and is correlated with the operation being performed.

5. The interlocked pipelined logic macros recited in claim 1, further comprising a clock circuit generating a clock signal from the strobe and reset signals so that the clock signal is automatically timed and synchronized to the strobe and reset signals and automatically tracks variations in chip delay caused by process and parameter variations.

6. A combination of a domino stage plus a latch further comprising a single first device added to the domino stage to form the latch where data is both launched and stored, a clock generator producing separate precharge and evaluate clocks which provide necessary timing to launch data and store data in the latch, a single second device connected between the first device and ground, said second device having a gate connected to the precharge clock, the second device making it easier to precharge an internal node of the domino stage by opening a path from the internal node to ground during precharge, the clock generator producing precharge and evaluate clocks by circuitry having at least data input and output paths and valid and reset paths that provide interlocked timing in both forward and reverse directions of data flow and that guarantee correct data output cycle sequencing.

7. The combination of a domino stage plus a latch of claim 6 wherein the domino stage comprises an n-channel logic tree, the internal node connecting the logic tree and the latch.

8. The combination of a domino stage plus a latch of claim 6 wherein the domino stage comprises a static logic macro and a single third device having an output of the static logic macro as its input, the output of the static logic macro being connected to a gate of the third device, said internal node being precharged every cycle by the precharge clock.

9. The combination of a domino stage plus a latch of claim 6 wherein the domino stage comprises a static logic macro and an n-channel device, an output of the static logic macro being connected to a gate of the n-channel device, further comprising dual rail input and dual rail outputs, only a side of the latch with a high input transitioning low with a path for data to an opposite side of the latch being through an inverter of cross coupled devices of the latch.

10. The combination of a domino stage plus a latch of claim 6 wherein the domino stage comprises a static logic macro and an n-channel device and a first p-channel device connected in series, an output of the static logic macro being connected to gates of the n-channel device and the p-channel device, a p-channel precharge device connected in series with the first p-channel device and having a gate connected to a complement of the evaluate clock, so that the internal node will only change state if there is a change in the state of data in that is connected to the n-channel device and the first p-channel device.

11. The combination of a domino stage plus a latch of claim 10 further comprising dual rail inputs and dual rail outputs, data in the latch changing state only if input dual rail data is in a different state from a previous cycle when the evaluate clock is activated.

12. A method of interconnecting and operating logic macros comprising the steps of:
    transmitting a valid signal from a first logic macro to a second logic macro signifying that data from the first logic macro has reached a valid state; and
    transmitting a reset signal from the second logic macro to the first logic macro signifying that the data has been received, the valid and reset signals providing interlocked timing in both forward and reverse directions of data flow and guarantee correct data output cycle sequencing.

13. The method recited in claim 12 wherein the macros are operated in a pipelined mode of operation.

14. The method recited in claim 12 further comprising the step of generating timing signals locally to the first and second logic macros.

15. The method recited in claim 14 further comprising at each of said first and second logic macros the steps of:
    receiving valid signals from a preceding logic macro and generating external reset signals;
    generating valid signals that track locally generated timing signals of the logic macro; and
    performing a handshaking function on reset signals coming from succeeding logic macros.

16. The method recited in claim 15 further comprising the step of generating a timing signal each cycle indicating that data is valid, the timing signal having adjustable timing correlated with an operation performed by the logic macro.

17. A method of operating a domino stage plus a latch wherein a single first device is added to the domino stage to form the latch where data is both launched and stored and a single second device is connected between the first device and ground, said second device having a gate connected to the precharge clock, the method comprising the steps of:

opening a path from the internal node to ground using the second device, making it easier to precharge an internal node of the domino stage; and generating separate precharge and evaluate clocks which provide necessary timing to launch data and store data in the latch by transmitting a valid signal from a first logic macro to a second logic macro signifying that data from the first logic macro has reached a valid state, and transmitting a reset signal from the second logic macro to the first logic macro signifying that the data has been received, the valid and reset signals providing interlocked timing in both forward and reverse directions of data flow and guarantee correct data output cycle sequencing.

18. The method recited in claim 17 wherein the macros are operated in a pipelined mode of operation.

19. The method recited in claim 17 further comprising the step of generating timing signals locally to the first and second logic macros.

20. The method recited in claim 19 further comprising at each of said first and second logic macros the steps of:

receiving valid signals from a preceding logic macro and generating external reset signals;

generating valid signals that track locally generated timing signals of the logic macro; and performing a handshaking function on reset signals coming from succeeding logic macros.

* * * * *